United States Patent
Landis et al.

(10) Patent No.: US 12,212,412 B2
(45) Date of Patent: Jan. 28, 2025

(54) NETWORK CODING TO MITIGATE BLOCKAGE WITH SPATIAL DIVISION MULTIPLEXING BEAMS

(71) Applicant: QUALCOMM Incorporated, San Diego, CA (US)

(72) Inventors: Shay Landis, Hod Hasharon (IL); Ran Berliner, Kfar-Aviv (IL); Idan Michael Horn, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/204,861

(22) Filed: Mar. 17, 2021

(65) Prior Publication Data

US 2022/0303047 A1    Sep. 22, 2022

(51) Int. Cl.
*H04L 1/00* (2006.01)
*H04W 72/044* (2023.01)

(52) U.S. Cl.
CPC ......... *H04L 1/0009* (2013.01); *H04W 72/046* (2013.01)

(58) Field of Classification Search
USPC ....................................................... 370/329
See application file for complete search history.

(56) References Cited

U.S. PATENT DOCUMENTS

| | | | | |
|---|---|---|---|---|
| 2012/0307726 A1* | 12/2012 | Pi | ................. | H04J 11/0069 370/328 |
| 2013/0286960 A1* | 10/2013 | Li | ................. | H04B 7/0684 370/329 |
| 2018/0206244 A1 | 7/2018 | Yang et al. | | |
| 2018/0324022 A1* | 11/2018 | Sheng | ............... | H04W 36/0061 |
| 2019/0044537 A1* | 2/2019 | Reynwar | ........... | H03M 13/1117 |
| 2021/0051495 A1 | 2/2021 | Gupta et al. | | |

FOREIGN PATENT DOCUMENTS

CN      109997398 A  *  7/2019  .......... H04B 17/373
WO   WO-2018075146 A1  *  4/2018

OTHER PUBLICATIONS

International Search Report and Written Opinion—PCT/US2022/070702—ISA/EPO—Jun. 3, 2022.

* cited by examiner

*Primary Examiner* — Jeffrey M Rutkowski
*Assistant Examiner* — Luna Weissberger
(74) *Attorney, Agent, or Firm* — Holland & Hart LLP

(57) ABSTRACT

Methods, systems, and devices for wireless communications are described. A user equipment (UE) may receive control signaling indicating a network coding configuration for a set of transmit beams, each transmit beam in the set of transmit beams being spatial division multiplexed with respect to the other transmit beams of the set. The UE may identify based at least in part on the control signaling, a first set of one or more transmit beams of the set of transmit beams carrying parity information for a second set of one or more transmit beams in the set of transmit beams. The UE may perform beamformed communications over the set of transmit beams in accordance with the network coding configuration and the parity information.

30 Claims, 15 Drawing Sheets

NETWORK CODING TO MITIGATE BLOCKAGE WITH SPATIAL DIVISION MULTIPLEXING BEAMS

FIELD OF TECHNOLOGY

The following relates to wireless communications, including network coding to mitigate blockage with spatial domain multiplexing beams.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support network coding to mitigate blockage with spatial domain multiplexing (SDM) beams. Generally, the described techniques provide for leveraging parity information carried or otherwise conveyed on one or more transmit beams to recover information from other transmit beams. For example, a user equipment (UE) and base station may be using a set of SDM transmit beams for beamformed communications. The base station may configure one or more beams of the set of spatial beams to carry parity information for the other spatial beams. That is, a transmit beam may carry parity information for the information carried on other transmit beams. If one of the transmit beams carrying data is temporarily blocked or otherwise unable to be decoded, the information on that transmit beam may be reconstructed using the parity information from the parity beam and the information decoded from other beams. In some cases, if multiple transmit beams are blocked or otherwise unavailable, the information carried on those transmit beams may be reconstructed iteratively using the parity information through a process of soft decision decoding. Accordingly, the UE and base station may perform beamformed communications over the set of transmit beams while using the parity information transmit beam(s) to recover information/data from other transmit beam(s) as needed.

A method for wireless communication at a UE is described. The method may include receiving a configuration of network coding for a set of transmit beams, each transmit beam in the set of transmit beam being spatial division multiplexed with respect to the other transmit beams, identifying based on the configuration of network coding, a first set of one or more transmit beams of the set of transmit beams carrying parity information for a second set of one or more transmit beams in the set of transmit beams, and performing beamformed communications over the set of transmit beams using the network coding and the parity information.

An apparatus for wireless communication at a UE is described. The apparatus may include a processor, memory coupled with the processor, and instructions stored in the memory. The instructions may be executable by the processor to cause the apparatus to receive a configuration of network coding for a set of transmit beams, each transmit beam in the set of transmit beam being spatial division multiplexed with respect to the other transmit beams, identify based on the configuration of network coding, a first set of one or more transmit beams of the set of transmit beams carrying parity information for a second set of one or more transmit beams in the set of transmit beams, and perform beamformed communications over the set of transmit beams using the network coding and the parity information.

Another apparatus for wireless communication at a UE is described. The apparatus may include means for receiving a configuration of network coding for a set of transmit beams, each transmit beam in the set of transmit beam being spatial division multiplexed with respect to the other transmit beams, means for identifying based on the configuration of network coding, a first set of one or more transmit beams of the set of transmit beams carrying parity information for a second set of one or more transmit beams in the set of transmit beams, and means for performing beamformed communications over the set of transmit beams using the network coding and the parity information.

A non-transitory computer-readable medium storing code for wireless communication at a UE is described. The code may include instructions executable by a processor to receive a configuration of network coding for a set of transmit beams, each transmit beam in the set of transmit beam being spatial division multiplexed with respect to the other transmit beams, identify based on the configuration of network coding, a first set of one or more transmit beams of the set of transmit beams carrying parity information for a second set of one or more transmit beams in the set of transmit beams, and perform beamformed communications over the set of transmit beams using the network coding and the parity information.

In some examples of the method, apparatuses, and non-transitory computer-readable medium described herein, performing beamformed communications over the set of transmit beams may include operations, features, means, or instructions for transmitting on the first set of one or more transmit beams the parity information for the second set of one or more transmit beams.

Some examples of the method, apparatuses, and non-transitory computer-readable medium described herein may further include operations, features, means, or instructions for generating the parity information for the second set of one or more transmit beams in accordance with a network coding scheme indicated in the configuration of network coding.

In some examples of the method, apparatuses, and non-transitory computer-readable medium described herein, the network coding scheme includes an exclusive or (XOR) scheme such that the parity information transmitted on the first set of one or more transmit beams includes an XOR of information transmitted on the second set of one or more transmit beams.

In some examples of the method, apparatuses, and non-transitory computer-readable medium described herein, performing beamformed communications over the set of transmit beams may include operations, features, means, or instructions for receiving on the first set of one or more transmit beams the parity information for the second set of one or more transmit beams.

Some examples of the method, apparatuses, and non-transitory computer-readable medium described herein may further include operations, features, means, or instructions for decoding information from a first transmit beam of the second set of one or more transmit beams using the parity information received on the first set of one or more transmit beams and information decoded from at least a second transmit beam of the second set of one or more transmit beams, where decoding the information from the first transmit beam may be in accordance with a network coding scheme indicated in the configuration of network coding.

In some examples of the method, apparatuses, and non-transitory computer-readable medium described herein, the network coding scheme includes an XOR scheme such that the parity information transmitted on the first set of one or more transmit beams includes an XOR of information transmitted on the second set of one or more transmit beams.

In some examples of the method, apparatuses, and non-transitory computer-readable medium described herein, decoding the information from the first transmit beam of the second set of one or more transmit beams may include operations, features, means, or instructions for iteratively decoding a set of multiple beams of the second set of one or more transmit beams, including performing a soft decision decoding procedure using the parity information transmitted on the first set of one or more transmit beams and the decoding result for at least the second transmit beam of the second set of one or more transmit beams.

Some examples of the method, apparatuses, and non-transitory computer-readable medium described herein may further include operations, features, means, or instructions for decoding the information from the first transmit beam of the second set of one or more transmit beams may be further based on a retransmission of the information from the first transmit beam.

In some examples of the method, apparatuses, and non-transitory computer-readable medium described herein, the network coding may be specific to one or more of a control channel or a data channel.

In some examples of the method, apparatuses, and non-transitory computer-readable medium described herein, the network coding may be performed at one or more of a channel bit level or an information bit level.

A method for wireless communication at a base station is described. The method may include identifying, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams, transmitting, to the UE and based on the identifying, a configuration of network coding for the set of transmit beams, and performing beamformed communications over the set of transmit beams using the network coding and the parity information.

An apparatus for wireless communication at a base station is described. The apparatus may include a processor, memory coupled with the processor, and instructions stored in the memory. The instructions may be executable by the processor to cause the apparatus to identify, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams, transmit, to the UE and based on the identifying, a configuration of network coding for the set of transmit beams, and perform beamformed communications over the set of transmit beams using the network coding and the parity information.

Another apparatus for wireless communication at a base station is described. The apparatus may include means for identifying, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams, means for transmitting, to the UE and based on the identifying, a configuration of network coding for the set of transmit beams, and means for performing beamformed communications over the set of transmit beams using the network coding and the parity information.

A non-transitory computer-readable medium storing code for wireless communication at a base station is described. The code may include instructions executable by a processor to identify, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams, transmit, to the UE and based on the identifying, a configuration of network coding for the set of transmit beams, and perform beamformed communications over the set of transmit beams using the network coding and the parity information.

In some examples of the method, apparatuses, and non-transitory computer-readable medium described herein, performing beamformed communications over the set of transmit beams may include operations, features, means, or instructions for transmitting on the first set of one or more transmit beams the parity information for the second set of one or more transmit beams.

Some examples of the method, apparatuses, and non-transitory computer-readable medium described herein may further include operations, features, means, or instructions for generating the parity information for the second set of one or more transmit beams in accordance with a network coding scheme indicated in the configuration of network coding.

In some examples of the method, apparatuses, and non-transitory computer-readable medium described herein, the network coding scheme includes an XOR scheme such that the parity information transmitted on the first set of one or more transmit beams includes an XOR of information transmitted on the second set of one or more transmit beams.

In some examples of the method, apparatuses, and non-transitory computer-readable medium described herein, performing beamformed communications over the set of transmit beams may include operations, features, means, or instructions for receiving on the first set of one or more transmit beams the parity information for the second set of one or more transmit beams.

Some examples of the method, apparatuses, and non-transitory computer-readable medium described herein may further include operations, features, means, or instructions for decoding information from a first transmit beam of the second set of one or more transmit beams using the parity information received on the first set of one or more transmit beams and information decoded from at least a second transmit beam of the second set of one or more transmit beams, where decoding the information from the first transmit beam may be in accordance with a network coding scheme indicated in the configuration of network coding.

In some examples of the method, apparatuses, and non-transitory computer-readable medium described herein, the network coding scheme includes an XOR scheme such that the parity information transmitted on the first set of one or more transmit beams includes an XOR of information transmitted on the second set of one or more transmit beams.

In some examples of the method, apparatuses, and non-transitory computer-readable medium described herein, decoding the information from the first transmit beam of the second set of one or more transmit beams may include operations, features, means, or instructions for iteratively decoding a set of multiple beams of the second set of one or more transmit beams, including performing a soft decision decoding procedure using the parity information transmitted on the first set of one or more transmit beams and the decoding result for at least the second transmit beam of the second set of one or more transmit beams.

Some examples of the method, apparatuses, and non-transitory computer-readable medium described herein may further include operations, features, means, or instructions for decoding the information from the first transmit beam of the second set of one or more transmit beams may be further based on a retransmission of the information from the first transmit beam.

In some examples of the method, apparatuses, and non-transitory computer-readable medium described herein, the network coding may be specific to one or more of a control channel or a data channel.

In some examples of the method, apparatuses, and non-transitory computer-readable medium described herein, the network coding may be performed at one or more of a channel bit level or an information bit level.

DETAILED DESCRIPTION

Some wireless communication systems may operate using high frequency bands (e.g., frequency rang four (FR4), FR five (FR5), etc.) for beamformed communications using transmit beams. The transmit beams in such high frequency bands may result in very narrow transmit beams providing greater degrees of spatial separation. This may support massive multiple-input/multiple-output (MIMO) operations using spatial division multiplexing (SDM) techniques (e.g., using the different transmit beams). However, such narrow transmit beams may be even more vulnerable to blockage or other interfering obstructions. Such blockages may be short term, but may trigger retransmissions, thus adding more delay to the beamformed communications.

Aspects of the disclosure are initially described in the context of wireless communication systems. Generally, the described techniques provide for leveraging parity information carried or otherwise conveyed on one or more transmit beams to recover information from other transmit beams. For example, a user equipment (UE) and base station may be using a set of SDM transmit beams for beamformed communications. The base station may configure one or more beams of the set of spatial beams to carry parity information for the other spatial beams. That is, a transmit beam may carry parity information for the information carried on other transmit beams. If one of the transmit beams carrying data is temporarily blocked or otherwise unable to be decoded, the information on that transmit beam may be reconstructed using the parity information from the parity beam and the information decoded from other beams. In some cases, if multiple transmit beams are blocked or otherwise unavailable, the information carried on those transmit beams may be reconstructed iteratively using the parity information through a process of soft decision decoding. Accordingly, the UE and base station may perform beamformed communications over the set of transmit beams while using the parity information transmit beam(s) to recover information/data from other transmit beam(s) as needed.

Aspects of the disclosure are further illustrated by and described with reference to apparatus diagrams, system diagrams, and flowcharts that relate to network coding to mitigate blockage with SDM beams.

Figure 1:
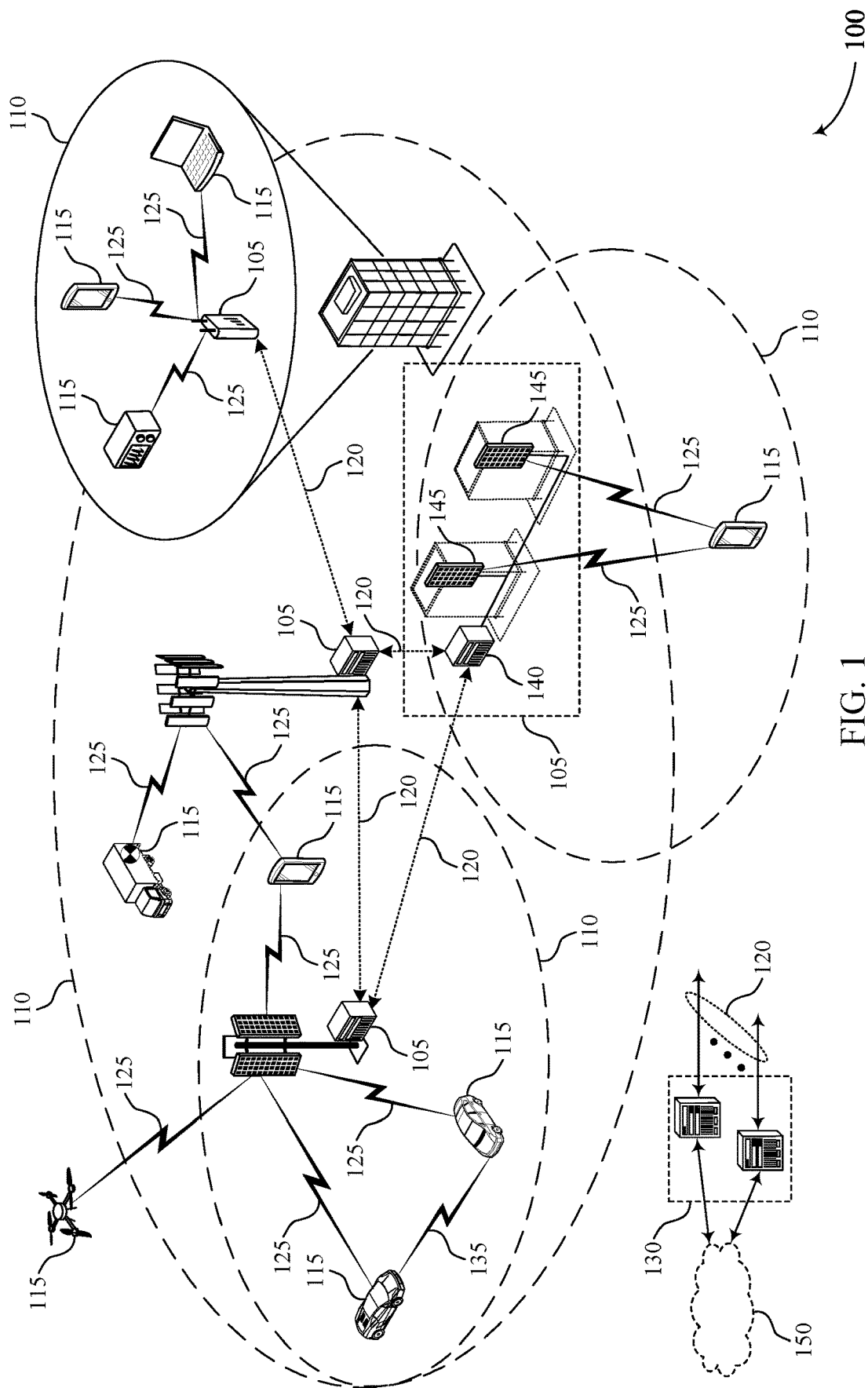
FIG. 1 illustrates an example of a wireless communication system that supports network coding to mitigate blockage with spatial domain multiplexing (SDM) beams in accordance with aspects of the present disclosure.

FIG. 1 illustrates an example of a wireless communication system 100 that supports network coding to mitigate blockage with SDM beams in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive control signaling indicating a network coding configuration for a set of transmit beams, each transmit beam in the set of transmit beams being spatial division multiplexed with respect to the other transmit beams of the set. The UE 115 may identify based at least in part on the control signaling, a first set of one or more transmit beams of the set of transmit beams carrying parity information for a second set of one or more transmit beams in the set of transmit beams. The UE 115 may perform beamformed communications over the set of transmit beams in accordance with the network coding configuration and the parity information.

A base station 105 may identify, for a UE 115, a first set of one or more transmit beams of a set of transmit beams carrying parity information for a second set of one or more transmit beams in the set of transmit beams, each transmit beam in the set of transmit beams being spatial division multiplexed with respect to the other transmit beams of the set. The base station 105 may transmit, to the UE 115 and based at least in part on the identifying, control signaling indicating a network coding configuration for the set of transmit beams. The base station 105 may perform beamformed communications over the set of transmit beams in accordance with the network coding configuration and the parity information.

Figure 2:
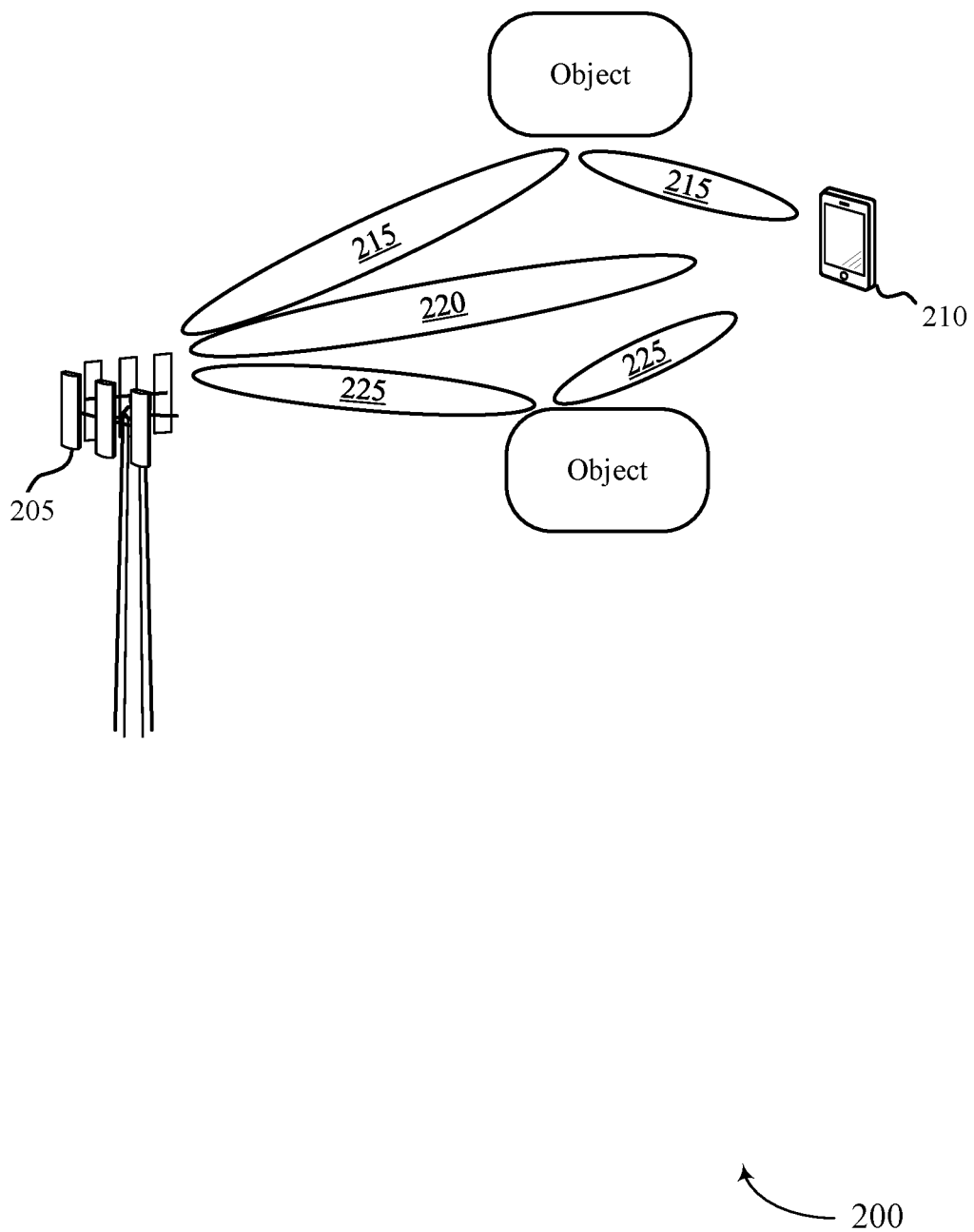
FIG. 2 illustrates an example of a wireless communication system that supports network coding to mitigate blockage with SDM beams in accordance with aspects of the present disclosure.

FIG. 2 illustrates an example of a wireless communication system 200 that supports network coding to mitigate blockage with SDM beams in accordance with aspects of the present disclosure. Wireless communication system 200 may implement aspects of wireless communication system 100. Wireless communication system 200 may include base station 205 and/or UE 210, which may be examples of the corresponding devices described herein.

Wireless communication system 200 may support beamformed communications between base station 205 and UE 210. The beamformed communications may include downlink communications and/or uplink communications. Wireless communication system 200 illustrates a non-limiting example of downlink beamformed communications from base station 205 to UE 210, although the described techniques may be equally implemented in the uplink communication scenario.

Broadly, the configuration/nature of the beamformed communications may change, at least to some degree, based on the operating frequency used for such beamformed communications. For example, beamformed communications in FR2 may generally use narrow directional analog beams (e.g., using phase arrays). Beamformed communications using high frequency bands (e.g., FR4, FR5, etc.) may use significantly more narrow beams to overcome the additional pathloss that is associated with using higher frequency carriers for beamformed communications. The transmit beams in such high frequency bands may result in very narrow transmit beams providing greater degrees of spatial separation. This may support massive multiple-input/multiple-output (MIMO) operations using SDM techniques (e.g., using the different transmit beams). However, such narrow transmit beams may be even more vulnerable to blockage or other interfering obstructions. Such blockages may be short term, but may trigger retransmissions, thus adding more delay to the beamformed communications. One advantage of using higher radio frequency spectrum bands is reduced latency. However, some applications may be sensitive to the time jitter associated with arriving packets, which may be exacerbated in higher frequency ranges.

Accordingly, aspects of the described techniques generally utilize network coding techniques to mitigate short time/term blockage of such transmit beams in higher frequency ranges. For example, the described techniques may introduce network coding between SDM beams that, at least to some degree, mitigate and/or overcome blockage or other interference with one or more of the transmit beams being used for beamformed communications. Such techniques may generally improve resilience for the beamformed communications during short-term blockage, reduce jitter associated with delays of information packets, reduce/cap latency of HARQ retransmissions, and the like.

For example, base station 205 may select, determine, or otherwise identify a set of transmit beams to use for communications with UE 210. In the non-limiting example illustrated in FIG. 2, this may include base station 205 identifying transmit beam 215, transmit beam 220, and transmit beam 225 to use for beamformed communications with UE 210. Each transmit beam in the set of transmit beams may be spatial domain multiplexed with respect to the other transmit beams. It is to be understood that the set of transmit beams may include more than three transmit beams or may include fewer than three transmit beams. The transmit beams may support beamformed communications with UE 210 directly (e.g., transmit beam 220) and/or indirectly based on bounces/reflections off of objects (e.g., transmit beam 215 and transmit beam 225). Accordingly, base station 205 and UE 210 may use M concurrent SDM transmit beams for beamformed communications, with M being equal to three in this non-limiting example.

In some aspects, the set of transmit beams may include a first set and a second set of transmit beams. Each set may include one or more beams. As one non-limiting example, this may include transmit beam 220 being in the first set of transmit beams and transmit beams 215 and 225 being in the second set of transmit beams. Broadly, the one or more transmit beams in the first set of transmit beams may carry or otherwise convey (implicitly and/or explicitly) parity information for the one or more transmit beams in the second set of transmit beams. For example, transmit beam 220 may carry or otherwise convey parity information (e.g., parity bits) for transmit beam 215 and/or for transmit beam 225. In some examples, transmit beam 220 (e.g., the transmit beam in the first set of transmit beams) may carry or otherwise convey the parity information alone or may carry parity information in addition to its own data/control information bits. In some examples, each transmit beam in the set of transmit beams may carry or otherwise convey, at least to some degree, parity information for the other transmit beams in the set of transmit beams. In some examples, the parity information carried or otherwise conveyed in the transmit beam(s) of the first set of transmit beams may be based on all transmit beams in the second set of transmit beams (e.g., the parity information may be for the full set of transmit beams in the second set of transmit beams).

Base station 205 may transmit or otherwise provide to UE 210 control signaling (e.g., RRC signaling, MAC CE signaling, or other higher layer signaling) that indicates a network coding configuration for the set of transmit beams. UE 210 may identify or otherwise determine the first set of transmit beam(s) of the set of transmit beams (e.g., identify which transmit beams carries parity information for the other transmit beams) based on the control signaling. For example, the control signaling may explicitly indicate the transmit beams in the set of transmit beams as well as which transmit beam(s) are included in the first set of transmit beams. The network coding configuration can be indicated separately for PDCCH and PDSCH channels (e.g., specific to a data channel or a control channel) or may be indicated jointly for both PDCCH and PDSCH (e.g., specific to both the data channel and the control channel). Moreover, the network coding configuration may be use for channel bits (e.g., performed on a channel bit level) and/or for information bits (e.g., performed on an information bit level).

In one non-limiting example, the parity information associated with the network coding configuration may include parity bits that can be used during an exclusive or (XOR) function. For example, the network coding scheme may include an XOR scheme such that the parity information from the first set of transmit beams (e.g., transmit beam 220) may be an XOR of information carried or otherwise conveyed in the transmit beams in the second set of transmit beams (e.g., XOR of information carried in transmit beam 215 and/or transmit beam 225).

Base station 205 and UE 210 may then perform beamformed communications over the set of transmit beams in accordance with the parity information as well as the network coding configuration. Continuing with the downlink beamformed communications example illustrated in FIG. 2, this may include base station 205 transmitting (and UE 210 receiving) the parity information on the transmit beam(s) in the first set of transmit beam(s) (e.g., transmit beam 220 in this example) for the transmit beam(s) in the second set of transmit beam(s). For example, base station 205 may transmit PDCCH and/or PDSCH to UE 210 carrying channel bits or information bits. UE 210 may initially attempt to successfully receive and decode the information/data carried on each transmit beam in the second set of transmit beams (e.g., transmit beam 215 and transmit beam 225). In the example, where transmit beam 220 also carries information/data (e.g., in addition to the parity information for transmit beams 215 and 225), UE 210 may attempt to successfully receive and decode the information/data also carried on transmit beam 220. If UE 210 is able to successfully receive and decode the information/data carried on all transmit beams, then the beamformed will be deemed successful. When operating in an acknowledgement mode, UE 210 may transmit a feedback message to base station 205 providing HARQ-ACK information for the beamformed communications.

However, in some situations UE 210 will be unable to successfully receive and decode information/data carried on the transmit beam(s) in the second set of transmit beams. For example, one or more transmit beams in the second set of transmit beams may be blocked or otherwise interfered with such that UE 210 is unable to successfully receive and decode the information/data carried on those transmit beams. Accordingly, in this situation UE 210 may, in accordance with the network coding configuration, decode information from the failed/blocked transmit beam(s) of the second set of transmit beam(s) using the parity information carried on the transmit beam(s) in the first set of transmit beam(s) in addition to from successfully received and decoded transmit beams of the second set of transmit beam(s) and/or the information obtained from the failed/blocked transmit beam(s). For example, one or more code blocks of the information carried in the failed/blocked transmit beam(s) in the second set of transmit beam(s) may have successfully passed a parity check at the decoder of UE 210. This may provide at least some information from the failed/blocked transmit beam(s) that can be used in an attempt to decode the remaining information using the parity information. In another example, the parity information carried in the first set of transmit beam(s) may be for the full set of transmit beams in the second set of transmit beams. For example, UE 210 may attempt to decode the failed/blocked transmit beam(s) from the second set of transmit beams by using information recovered from successfully received and decoded transmit beams in the second set in addition to the parity information carried in the first set of transmit beams. In one non-limiting example, this may include UE 210 performing an XOR function using the known information from the successfully received and decoded transmit beams in the second set of transmit beams, the unknown information in the unsuccessfully received and decoded transmit beam(s) in the second set of transmit beams, and the parity information carried in the first set of transmit beams.

More particularly, each code block in the beamformed communications may include information/control bits, as well as parity bits that are meant to be used to recover the code block. If a portion of the code block is unrecoverable due to failed/blocked transmit beam(s) in the second set of transmit beam(s), then the parity information from that code block may also be lost. Typically, UE 210 in this situation would send a NACK information for the code block (or code block group) and base station 205 may retransmit the lost information. However, in accordance with aspects of the described techniques, UE 210 may instead use the parity information carried in the transmit beam(s) of the first set of transmit beam(s) to attempt to decode the information/data carried in the failed/blocked transmit beam(s) of the second set of transmit beam(s). For example, UE 210 may use the parity information carried in the first set of transmit beam(s) to attempt to decode the information/data carried in the failed/blocked transmit beam(s) of the second set of transmit beams. As discussed above, this may include UE 210 performing an XOR function using the parity bits from the first set of transmit beam(s) with the recovered information from the failed/blocked transmit beam(s) and/or from the successfully received and decoded transmit beam(s) from the second set of transmit beam(s). For example, UE 210 may iteratively attempt to decode the failed/blocked transmit beam(s) of the second set of transmit beam(s) using a soft decision decoding procedure using the parity information from the first set of transmit beam(s) and the information decoded from the failed/blocked transmit beam(s) and/or from successfully received and decoded transmit beam(s) of the second set of transmit beam(s). As discussed above, the beamformed communications supported by the parity information carried in the first set of transmit beam(s) may include initial transmissions and/or retransmissions.

Accordingly, UE 210 may use the parity information carried in the first set of transmit beam(s) to attempt to decode information/data carried on the failed/blocked transmit beam(s) of the second set of transmit beams. In the situation where the transmit beam(s) of the second set of transmit beams become blocked during some or all of a slot, UE 210 may be able to fully recover the information carried in the failed/blocked transmit beam(s) using the parity information carried in the transmit beam(s) of the first set of transmit beam(s) in addition to known/unknown aspects recovered from the transmit beam(s) in the second set of transmit beams. If more than one transmit beam in the second set of transmit beams fails UE 210 may use the soft decision decoding attempt on the XOR parity checks to iteratively attempt to decode the failed/blocked information. In some examples, more complicated network coding configurations may be applied on the transmit beams to adjust the level of resilience/reliability to blockage with varying overheads. Aspects of these techniques may be combined with HARQ retransmissions so that short-term blockage will not cause the HARQ retransmissions to fail (e.g., to avoid excess latency beyond a latency threshold).

As discussed above, aspects of the described techniques may be equally applicable to uplink beamformed communications from UE 210 to base station 205. For example, UE 210 may select, determine, or otherwise identify a set of transmit beams to use for beamformed communications with base station 205 (not shown). Again, the set of transmit beams may include transmit beam(s) in a first set of transmit beam(s) that carries parity information for transmit beam(s) in a second set of transmit beam(s). Performing such beamformed communications may include UE 210 transmitting PUCCH and/or PUSCH information (e.g., at the channel bit level and/or at the information bit level) to base station 205. Base station 205 may first attempt to successfully receive and decode the uplink beamformed communications. If one or more transmit beams of the second set of transmit beam(s) fail decoding, base station 205 may use the parity information carried on the transmit beam(s) of the first set of transmit beam(s) in addition to any recovered information/data from the failed/blocked transmit beam(s) (e.g., unknown information) in addition to information recovered from the successful transmit beams in the second set to attempt to decode and recover the information/data from the failed/blocked transmit beam(s). For example, base station 205 may iteratively attempt to decode the failed/blocked information/data using the soft decision process based on the XOR functions performed using the parity information and the known/unknown information derived from the transmit beams in the second set of transmit beams.

Figure 3:
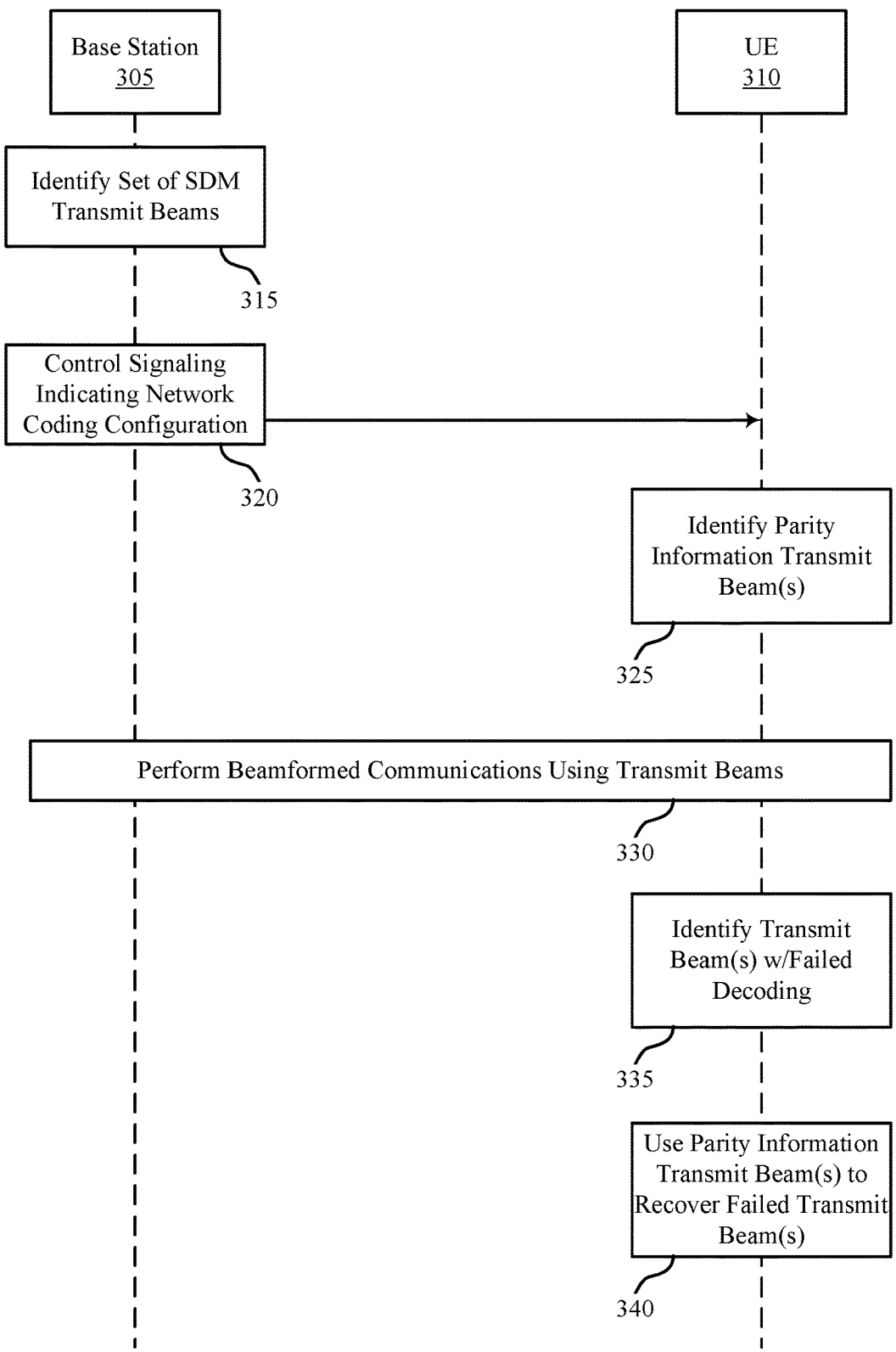
FIG. 3 illustrates an example of a process that supports network coding to mitigate blockage with SDM beams in accordance with aspects of the present disclosure.

FIG. 3 illustrates an example of a process 300 that supports network coding to mitigate blockage with SDM beams in accordance with aspects of the present disclosure. Aspects of process 300 may be implemented by wireless communication systems 100 and/or 200. Aspects of process 300 may be implemented by or implemented at base station 305 and/or UE 310, which may be examples of the corresponding devices described herein. Although process 300 illustrates an example of the described techniques being performed in a downlink scenario, it is to be understood that such techniques may be equally applied to an uplink scenario.

At 315, base station 305 may identify, configuration, or otherwise select a set of transmit beams to use for beamformed communications with UE 310. The transmit beams in the set of transmit beams may be spatial domain multiplexed with respect to each other. The set of transmit beams may include one or more transmit beams in a first set of transmit beams and one or more transmit beams in a second set of transmit beams. The transmit beam(s) in the first set of transmit beams may carry or otherwise convey parity information for the transmit beam(s) in the second set of transmit beams. The parity information may include parity bits, or some other parity information that may be used in a network coding configuration.

At 320, base station 305 may transmit or otherwise provide (and UE 310 may receive or otherwise obtain) control signaling (e.g., RRC signaling, MAC CE signaling, or some other higher layer signaling) identifying or otherwise indicating a network coding configuration for the set of transmit beams. In some examples, the indication of the network coding configuration may identify the transmit beam(s) in the first set of transmit beams that carry the parity information for the transmit beam(s) of the second set of transmit beams, may identify which transmit beam(s) in the first set of transmit beams carry parity information for specific transmit beam(s) in the second set of transmit beams, and the like. In some examples, the indication of the network coding configuration may indicate the decoding scheme to be applied using the parity information. Other examples of information carried or otherwise conveyed in the network coding configuration indication may also be used.

At 325, UE 310 may use the control signaling to identify the first set of transmit beams and the second set of transmit beams from the set of transmit beams. For example, The control signaling may identify the transmit beams in each set of transmit beams and/or may carry a reference index, field, value, etc., that can be used by UE 310 to identify the transmit beams in the first and second sets of transmit beams (e.g., based on a lookup table or some other configured reference information). In some examples, the control signaling may use a setting or parameter configured for the beamformed communications to implicitly indicate the transmit beams in the first and second sets of transmit beams.

At 330, base station 305 and UE 310 may generally perform the beamformed communications over the set of transmit beams according to the network coding configuration and the parity information. The beamformed communications may include downlink communications from base station 305 to UE 310 (as is shown in FIG. 3) and/or may include uplink communications from UE 310 to base station 305.

However, at 335 UE 310 may optionally determine that the decoding attempts for one or more transmit beams in the second set of transmit beams has failed. For example, UE 310 may determine that one or more steps in the decoding process (e.g., parity checks) have failed (e.g., failed a CRC), and therefore the complete information carried in those failed transmit beam(s) from the second set of transmit beams has not been recovered. In some examples, some of the transmit beams in the second set may be successfully received and decoded while other transmit beams in the second set may be unsuccessfully received and decoded.

Accordingly and at 340, UE 310 may use the parity information carried or otherwise conveyed in the transmit beam(s) of the first set of transmit beams to attempt to recover the information/data from the failed transmit beam(s). For example, the network coding scheme indicated in the network coding configuration identified in the control signaling may include an XOR scheme that uses the parity information carried in the first set of transmit beam(s) that is XORed with information transmitted on the second set of transmit beam(s) (e.g., with the information that was recoverable from the failed/blocked transmit beam(s) and/or the successful transmit beam(s) of the second set of transmit beams). This may include UE 310 iteratively decoding a plurality of beams of the second set of transmit beams (e.g., the failed transmit beam(s)) using a soft decision decoding procedure using the parity information and the information/data carried in the second set of transmit beam(s) that were successfully received and decoded.

Figure 4:
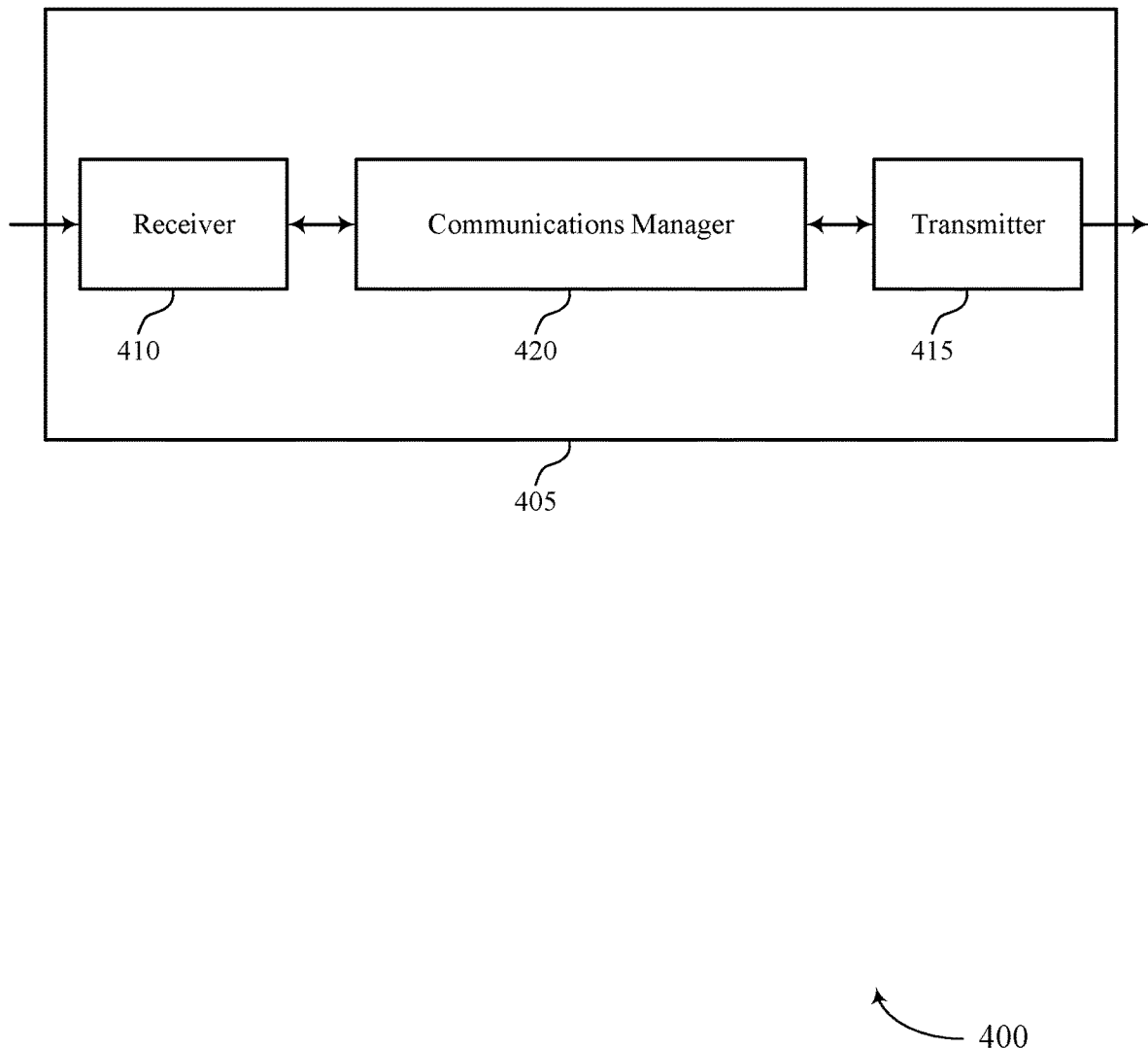
FIGS. 4 and 5 show block diagrams of devices that support network coding to mitigate blockage with SDM beams in accordance with aspects of the present disclosure.

FIG. 4 shows a block diagram 400 of a device 405 that supports network coding to mitigate blockage with SDM beams in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to network coding to mitigate blockage with SDM beams). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to network coding to mitigate blockage with SDM beams). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of network coding to mitigate blockage with SDM beams as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving a configuration of network coding for a set of transmit beams, each transmit beam in the set of transmit beam being spatial division multiplexed with respect to the other transmit beams. The communications manager 420 may be configured as or otherwise support a means for identifying based on the configuration of network coding, a first set of one or more transmit beams of the set of transmit beams carrying parity information for a second set of one or more transmit beams in the set of transmit beams. The communications manager 420 may be configured as or otherwise support a means for performing beamformed communications over the set of transmit beams using the network coding and the parity information.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improved beamformed communications that reduces latency, increased reliability, and reduces the costs associated with beamformed communications (e.g., costs in terms of processing requirements, latency/reliability thresholds, wireless medium, etc.). This may include relying on parity information carried in some transmit beam(s) that is for other transmit beam(s) used for the beamformed communications.

Figure 5:
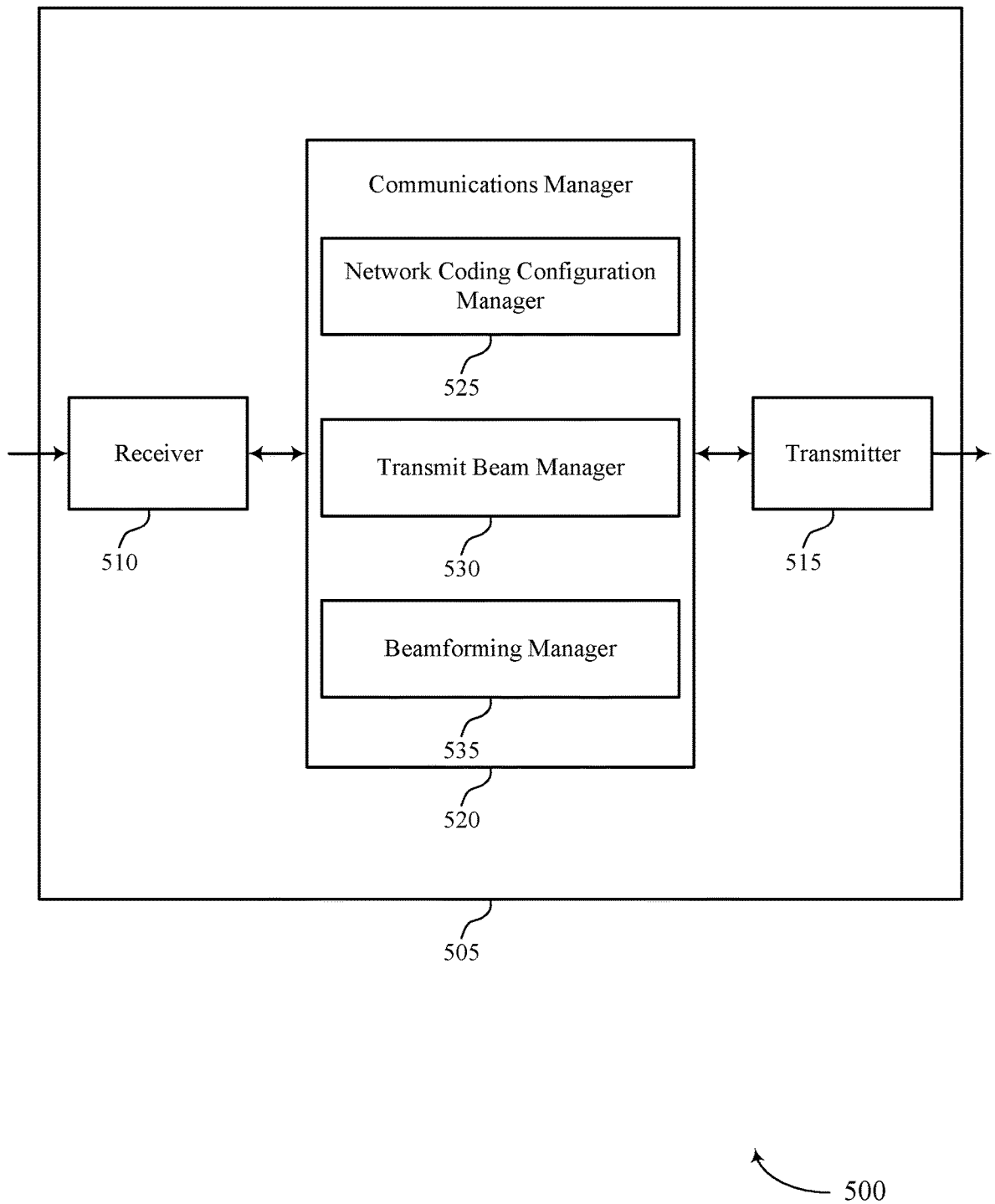

FIG. 5 shows a block diagram 500 of a device 505 that supports network coding to mitigate blockage with SDM beams in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to network coding to mitigate blockage with SDM beams). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to network coding to mitigate blockage with SDM beams). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of network coding to mitigate blockage with SDM beams as described herein. For example, the communications manager 520 may include a network coding configuration manager 525, a transmit beam manager 530, a beamforming manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The network coding configuration manager 525 may be configured as or otherwise support a means for receiving a configuration of network coding for a set of transmit beams, each transmit beam in the set of transmit beam being spatial division multiplexed with respect to the other transmit beams. The transmit beam manager 530 may be configured as or otherwise support a means for identifying based on the configuration of network coding, a first set of one or more transmit beams of the set of transmit beams carrying parity information for a second set of one or more transmit beams in the set of transmit beams. The beamforming manager 535 may be configured as or otherwise support a means for performing beamformed communications over the set of transmit beams using the network coding and the parity information.

Figure 6:
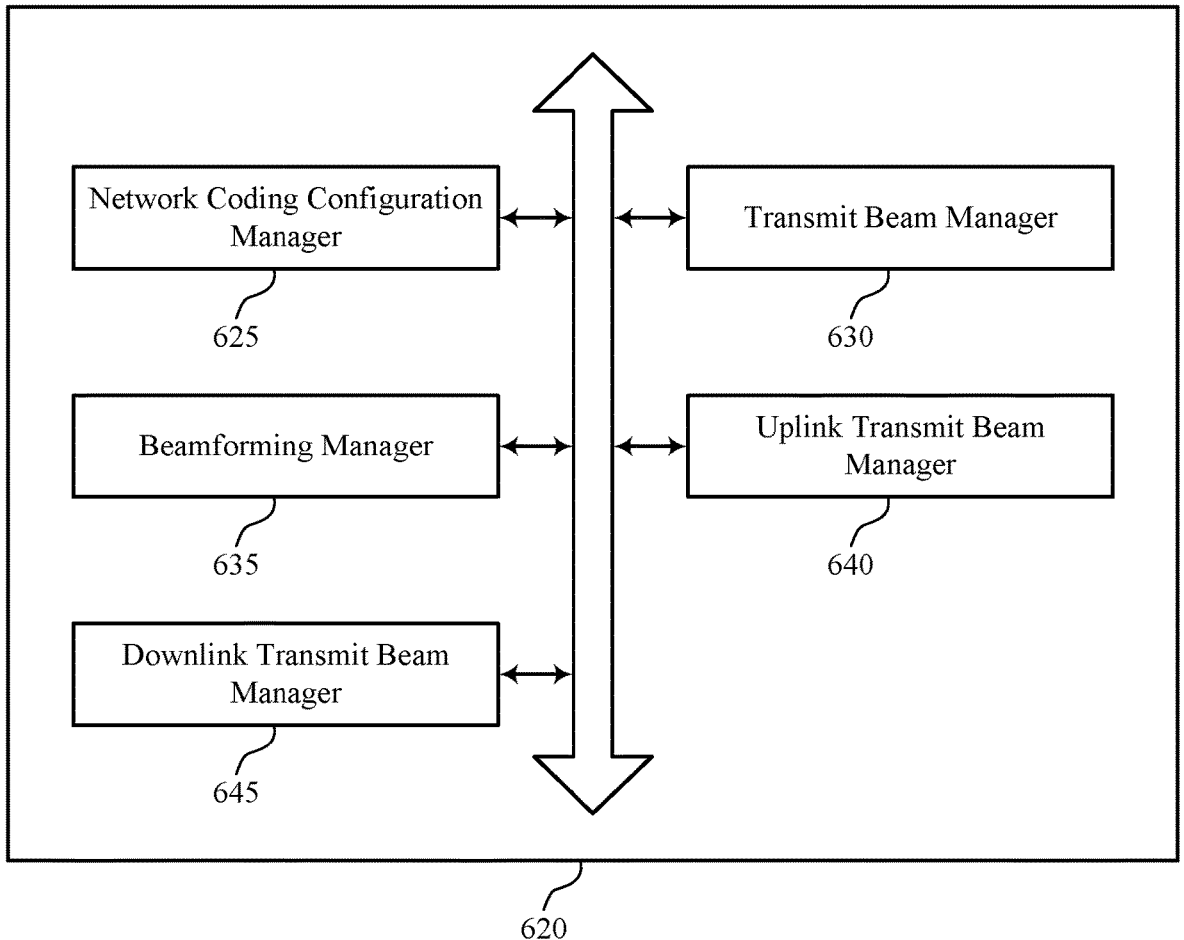
FIG. 6 shows a block diagram of a communications manager that supports network coding to mitigate blockage with SDM beams in accordance with aspects of the present disclosure.

FIG. 6 shows a block diagram 600 of a communications manager 620 that supports network coding to mitigate blockage with SDM beams in accordance with aspects of the present disclosure. The communications manager 620 may be an example of aspects of a communications manager 420, a communications manager 520, or both, as described herein. The communications manager 620, or various components thereof, may be an example of means for performing various aspects of network coding to mitigate blockage with SDM beams as described herein. For example, the communications manager 620 may include a network coding configuration manager 625, a transmit beam manager 630, a beamforming manager 635, an uplink transmit beam manager 640, a downlink transmit beam manager 645, or any combination thereof. Each of these components may communicate, directly or indirectly, with one another (e.g., via one or more buses).

The communications manager 620 may support wireless communication at a UE in accordance with examples as disclosed herein. The network coding configuration manager 625 may be configured as or otherwise support a means for receiving a configuration of network coding for a set of transmit beams, each transmit beam in the set of transmit beam being spatial division multiplexed with respect to the other transmit beams. The transmit beam manager 630 may be configured as or otherwise support a means for identifying based on the configuration of network coding, a first set of one or more transmit beams of the set of transmit beams carrying parity information for a second set of one or more transmit beams in the set of transmit beams. The beamforming manager 635 may be configured as or otherwise support a means for performing beamformed communications over the set of transmit beams using the network coding and the parity information.

In some examples, to support performing beamformed communications over the set of transmit beams, the uplink transmit beam manager 640 may be configured as or otherwise support a means for transmitting on the first set of one or more transmit beams the parity information for the second set of one or more transmit beams. In some examples, the uplink transmit beam manager 640 may be configured as or otherwise support a means for generating the parity information for the second set of one or more transmit beams in accordance with a network coding scheme indicated in the configuration of network coding. In some examples, the network coding scheme includes an XOR scheme such that the parity information transmitted on the first set of one or more transmit beams includes an XOR of information transmitted on the second set of one or more transmit beams.

In some examples, to support performing beamformed communications over the set of transmit beams, the downlink transmit beam manager 645 may be configured as or otherwise support a means for receiving on the first set of one or more transmit beams the parity information for the second set of one or more transmit beams. In some examples, the downlink transmit beam manager 645 may be configured as or otherwise support a means for decoding information from a first transmit beam of the second set of one or more transmit beams using the parity information received on the first set of one or more transmit beams and information decoded from at least a second transmit beam of the second set of one or more transmit beams, where decoding the information from the first transmit beam is in accordance with a network coding scheme indicated in the configuration of network coding. In some examples, the network coding scheme includes an XOR scheme such that the parity information transmitted on the first set of one or more transmit beams includes an XOR of information transmitted on the second set of one or more transmit beams.

In some examples, to support decoding the information from the first transmit beam of the second set of one or more transmit beams, the downlink transmit beam manager 645 may be configured as or otherwise support a means for iteratively decoding a set of multiple beams of the second set of one or more transmit beams, including performing a soft decision decoding procedure using the parity information transmitted on the first set of one or more transmit beams and the decoding result for at least the second transmit beam of the second set of one or more transmit beams. In some examples, decoding the information from the first transmit beam of the second set of one or more transmit beams is further based on a retransmission of the information from the first transmit beam. In some examples, the network coding is specific to one or more of a control channel or a data channel. In some examples, the network coding is performed at one or more of a channel bit level or an information bit level.

Figure 7:
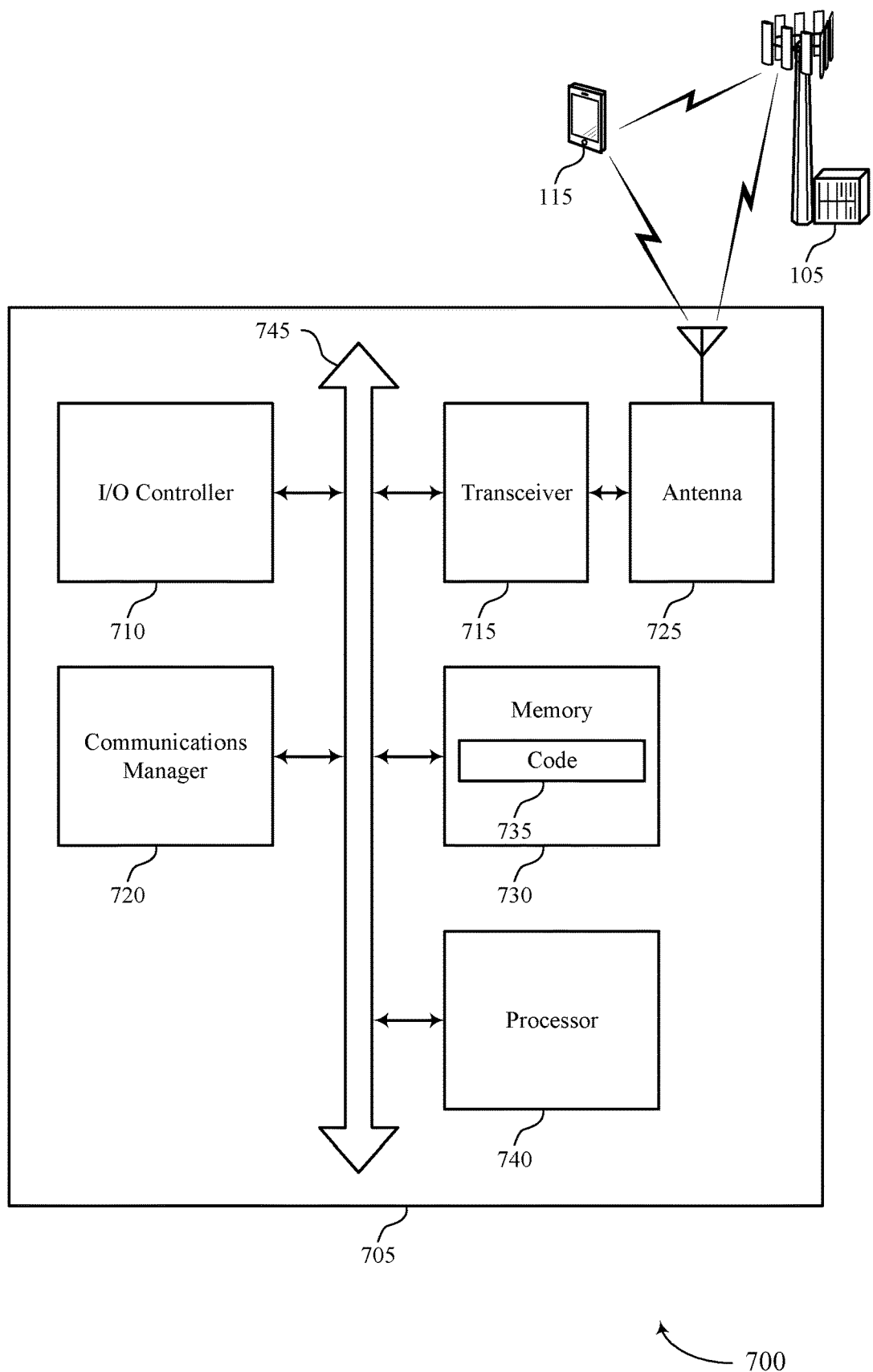
FIG. 7 shows a diagram of a system including a device that supports network coding to mitigate blockage with SDM beams in accordance with aspects of the present disclosure.

FIG. 7 shows a diagram of a system 700 including a device 705 that supports network coding to mitigate blockage with SDM beams in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting network coding to mitigate blockage with SDM beams). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving a configuration of network coding for a set of transmit beams, each transmit beam in the set of transmit beam being spatial division multiplexed with respect to the other transmit beams. The communications manager 720 may be configured as or otherwise support a means for identifying based on the configuration of network coding, a first set of one or more transmit beams of the set of transmit beams carrying parity information for a second set of one or more transmit beams in the set of transmit beams. The communications manager 720 may be configured as or otherwise support a means for performing beamformed communications over the set of transmit beams using the network coding and the parity information.

By including or configuring the communications manager 720 in accordance with examples as described herein, the device 705 may support techniques for improved beamformed communications that reduces latency, increased reliability, and reduces the costs associated with beamformed communications (e.g., costs in terms of processing requirements, latency/reliability thresholds, wireless medium, etc.). This may include relying on parity information carried in some transmit beam(s) that is for other transmit beam(s) used for the beamformed communications.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of network coding to mitigate blockage with SDM beams as described herein, or the processor 740 and the memory 730 may be otherwise configured to perform or support such operations.

Figure 8:
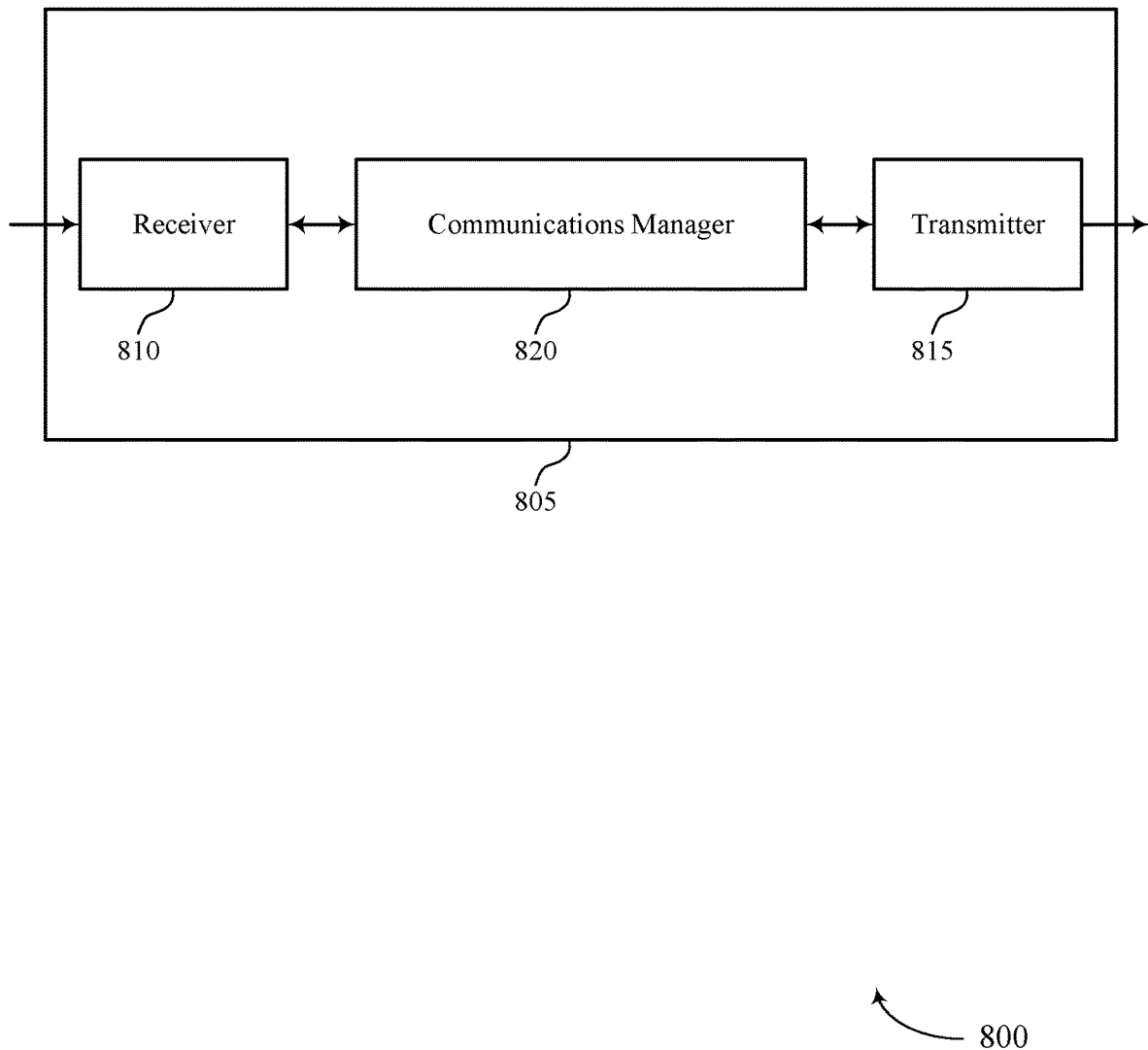
FIGS. 8 and 9 show block diagrams of devices that support network coding to mitigate blockage with SDM beams in accordance with aspects of the present disclosure.

FIG. 8 shows a block diagram 800 of a device 805 that supports network coding to mitigate blockage with SDM beams in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to network coding to mitigate blockage with SDM beams). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to network coding to mitigate blockage with SDM beams). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of network coding to mitigate blockage with SDM beams as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for identifying, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams. The communications manager 820 may be configured as or otherwise support a means for transmitting, to the UE and based on the identifying, a configuration of network coding for the set of transmit beams. The communications manager 820 may be configured as or otherwise support a means for performing beamformed communications over the set of transmit beams using the network coding and the parity information.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improved beamformed communications that reduces latency, increased reliability, and reduces the costs associated with beamformed communications (e.g., costs in terms of processing requirements, latency/reliability thresholds, wireless medium, etc.). This may include relying on parity information carried in some transmit beam(s) that is for other transmit beam(s) used for the beamformed communications.

Figure 9:
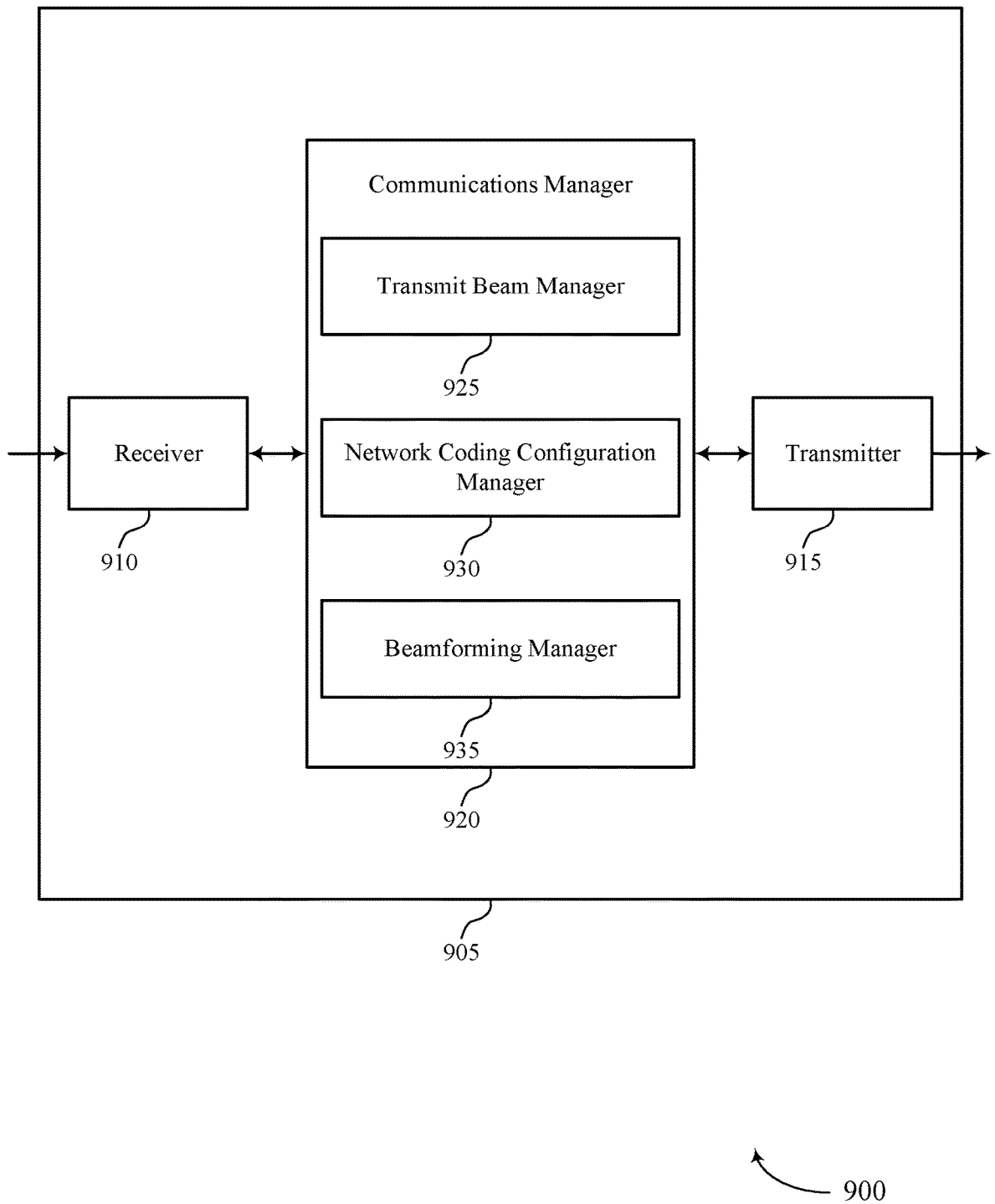

FIG. 9 shows a block diagram 900 of a device 905 that supports network coding to mitigate blockage with SDM beams in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to network coding to mitigate blockage with SDM beams). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to network coding to mitigate blockage with SDM beams). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of network coding to mitigate blockage with SDM beams as described herein. For example, the communications manager 920 may include a transmit beam manager 925, a network coding configuration manager 930, a beamforming manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The transmit beam manager 925 may be configured as or otherwise support a means for identifying, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams. The network coding configuration manager 930 may be configured as or otherwise support a means for transmitting, to the UE and based on the identifying, a configuration of network coding for the set of transmit beams. The beamforming manager 935 may be configured as or otherwise support a means for performing beamformed communications over the set of transmit beams using the network coding and the parity information.

Figure 10:
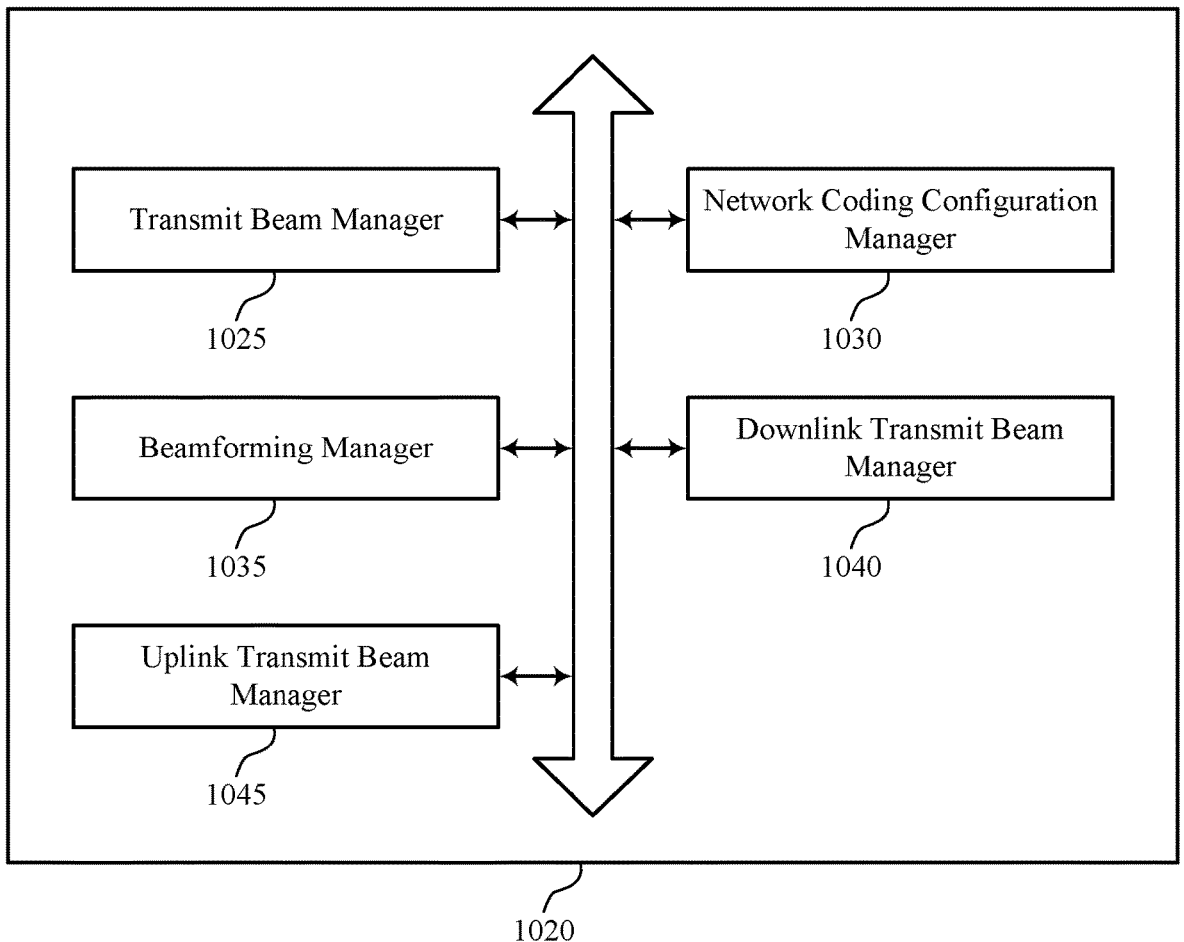
FIG. 10 shows a block diagram of a communications manager that supports network coding to mitigate blockage with SDM beams in accordance with aspects of the present disclosure.

FIG. 10 shows a block diagram 1000 of a communications manager 1020 that supports network coding to mitigate blockage with SDM beams in accordance with aspects of the present disclosure. The communications manager 1020 may be an example of aspects of a communications manager 820, a communications manager 920, or both, as described herein. The communications manager 1020, or various components thereof, may be an example of means for performing various aspects of network coding to mitigate blockage with SDM beams as described herein. For example, the communications manager 1020 may include a transmit beam manager 1025, a network coding configuration manager 1030, a beamforming manager 1035, a downlink transmit beam manager 1040, an uplink transmit beam manager 1045, or any combination thereof. Each of these components may communicate, directly or indirectly, with one another (e.g., via one or more buses).

The communications manager 1020 may support wireless communication at a base station in accordance with examples as disclosed herein. The transmit beam manager 1025 may be configured as or otherwise support a means for identifying, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams. The network coding configuration manager 1030 may be configured as or otherwise support a means for transmitting, to the UE and based on the identifying, a configuration of network coding for the set of transmit beams. The beamforming manager 1035 may be configured as or otherwise support a means for performing beamformed communications over the set of transmit beams using the network coding and the parity information.

In some examples, to support performing beamformed communications over the set of transmit beams, the downlink transmit beam manager 1040 may be configured as or otherwise support a means for transmitting on the first set of one or more transmit beams the parity information for the second set of one or more transmit beams. In some examples, the downlink transmit beam manager 1040 may be configured as or otherwise support a means for generating the parity information for the second set of one or more transmit beams in accordance with a network coding scheme indicated in the configuration of network coding. In some examples, the network coding scheme includes an XOR scheme such that the parity information transmitted on the first set of one or more transmit beams includes an XOR of information transmitted on the second set of one or more transmit beams.

In some examples, to support performing beamformed communications over the set of transmit beams, the uplink transmit beam manager 1045 may be configured as or otherwise support a means for receiving on the first set of one or more transmit beams the parity information for the second set of one or more transmit beams. In some examples, the uplink transmit beam manager 1045 may be configured as or otherwise support a means for decoding information from a first transmit beam of the second set of one or more transmit beams using the parity information received on the first set of one or more transmit beams and information decoded from at least a second transmit beam of the second set of one or more transmit beams, where decoding the information from the first transmit beam is in accordance with a network coding scheme indicated in the configuration of network coding. In some examples, the network coding scheme includes an XOR scheme such that the parity information transmitted on the first set of one or more transmit beams includes an XOR of information transmitted on the second set of one or more transmit beams.

In some examples, to support decoding the information from the first transmit beam of the second set of one or more transmit beams, the uplink transmit beam manager 1045 may be configured as or otherwise support a means for iteratively decoding a set of multiple beams of the second set of one or more transmit beams, including performing a soft decision decoding procedure using the parity information transmitted on the first set of one or more transmit beams and the decoding result for at least the second transmit beam of the second set of one or more transmit beams. In some examples, decoding the information from the first transmit beam of the second set of one or more transmit beams is further based on a retransmission of the information from the first transmit beam. In some examples, the network coding is specific to one or more of a control channel or a data channel. In some examples, the network coding is performed at one or more of a channel bit level or an information bit level.

Figure 11:
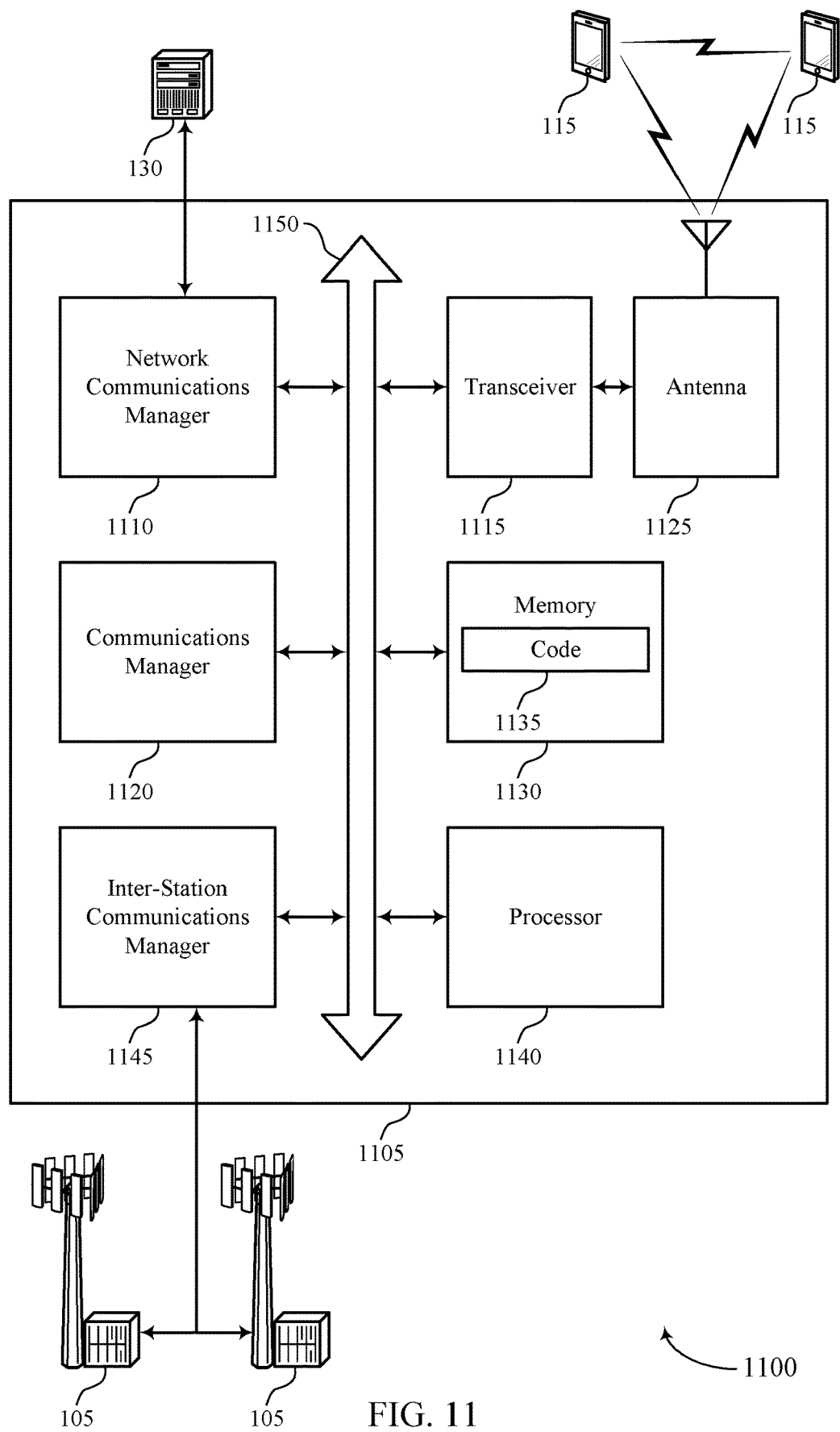
FIG. 11 shows a diagram of a system including a device that supports network coding to mitigate blockage with SDM beams in accordance with aspects of the present disclosure.

FIG. 11 shows a diagram of a system 1100 including a device 1105 that supports network coding to mitigate blockage with SDM beams in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting network coding to mitigate blockage with SDM beams). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for identifying, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams. The communications manager 1120 may be configured as or otherwise support a means for transmitting, to the UE and based on the identifying, a configuration of network coding for the set of transmit beams. The communications manager 1120 may be configured as or otherwise support a means for performing beamformed communications over the set of transmit beams using the network coding and the parity information.

By including or configuring the communications manager 1120 in accordance with examples as described herein, the device 1105 may support techniques for improved beamformed communications that reduces latency, increased reliability, and reduces the costs associated with beamformed communications (e.g., costs in terms of processing requirements, latency/reliability thresholds, wireless medium, etc.). This may include relying on parity information carried in some transmit beam(s) that is for other transmit beam(s) used for the beamformed communications.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of network coding to mitigate blockage with SDM beams as described herein, or the processor 1140 and the memory 1130 may be otherwise configured to perform or support such operations.

Figure 12:
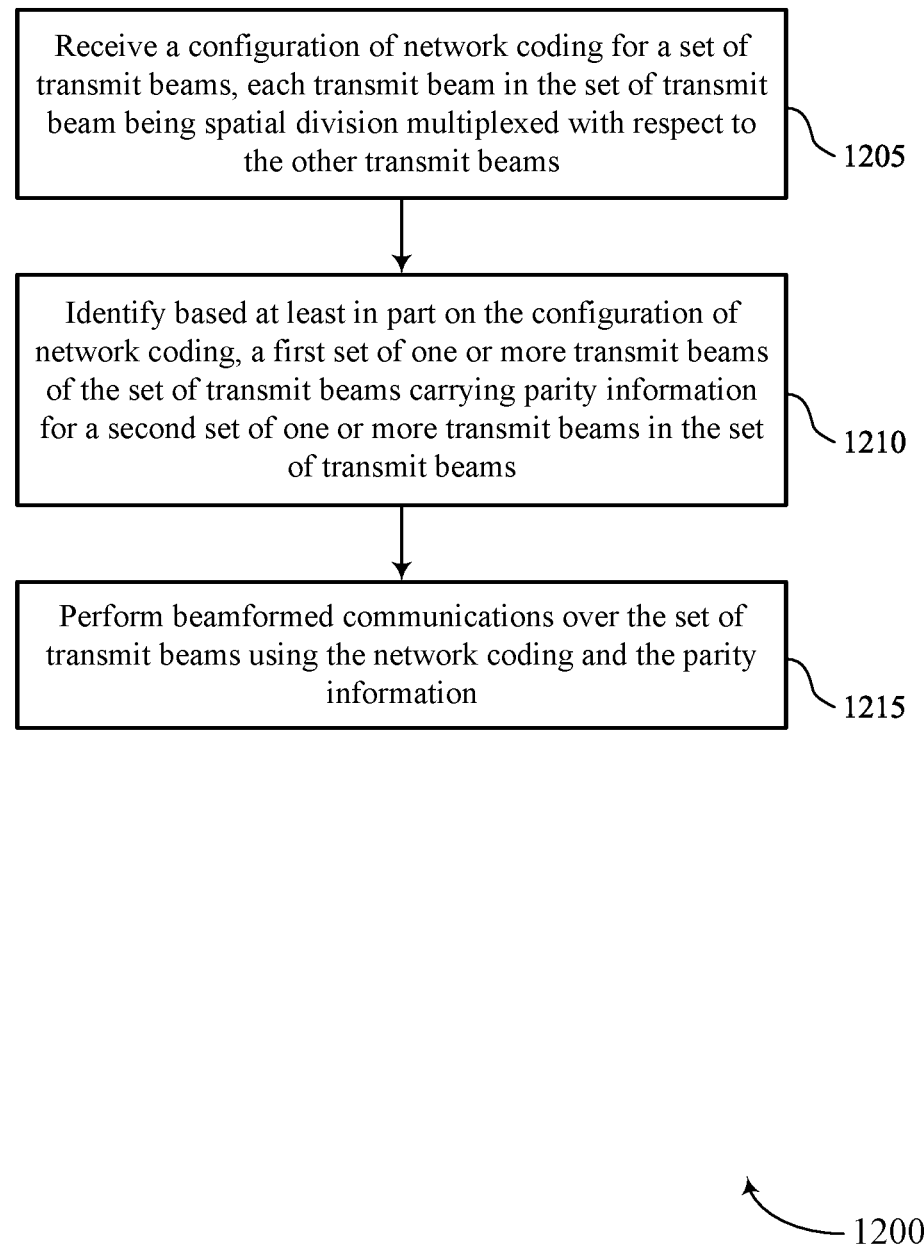
FIGS. 12 through 15 show flowcharts illustrating methods that support network coding to mitigate blockage with SDM beams in accordance with aspects of the present disclosure.

FIG. 12 shows a flowchart illustrating a method 1200 that supports network coding to mitigate blockage with SDM beams in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a configuration of network coding for a set of transmit beams, each transmit beam in the set of transmit beam being spatial division multiplexed with respect to the other transmit beams. The operations of 1205 may be performed in accordance with examples as disclosed herein. In some examples, aspects of the operations of 1205 may be performed by a network coding configuration manager 625 as described with reference to FIG. 6.

At 1210, the method may include identifying based on the configuration of network coding, a first set of one or more transmit beams of the set of transmit beams carrying parity information for a second set of one or more transmit beams in the set of transmit beams. The operations of 1210 may be performed in accordance with examples as disclosed herein. In some examples, aspects of the operations of 1210 may be performed by a transmit beam manager 630 as described with reference to FIG. 6.

At 1215, the method may include performing beamformed communications over the set of transmit beams using the network coding and the parity information. The operations of 1215 may be performed in accordance with examples as disclosed herein. In some examples, aspects of the operations of 1215 may be performed by a beamforming manager 635 as described with reference to FIG. 6.

Figure 13:
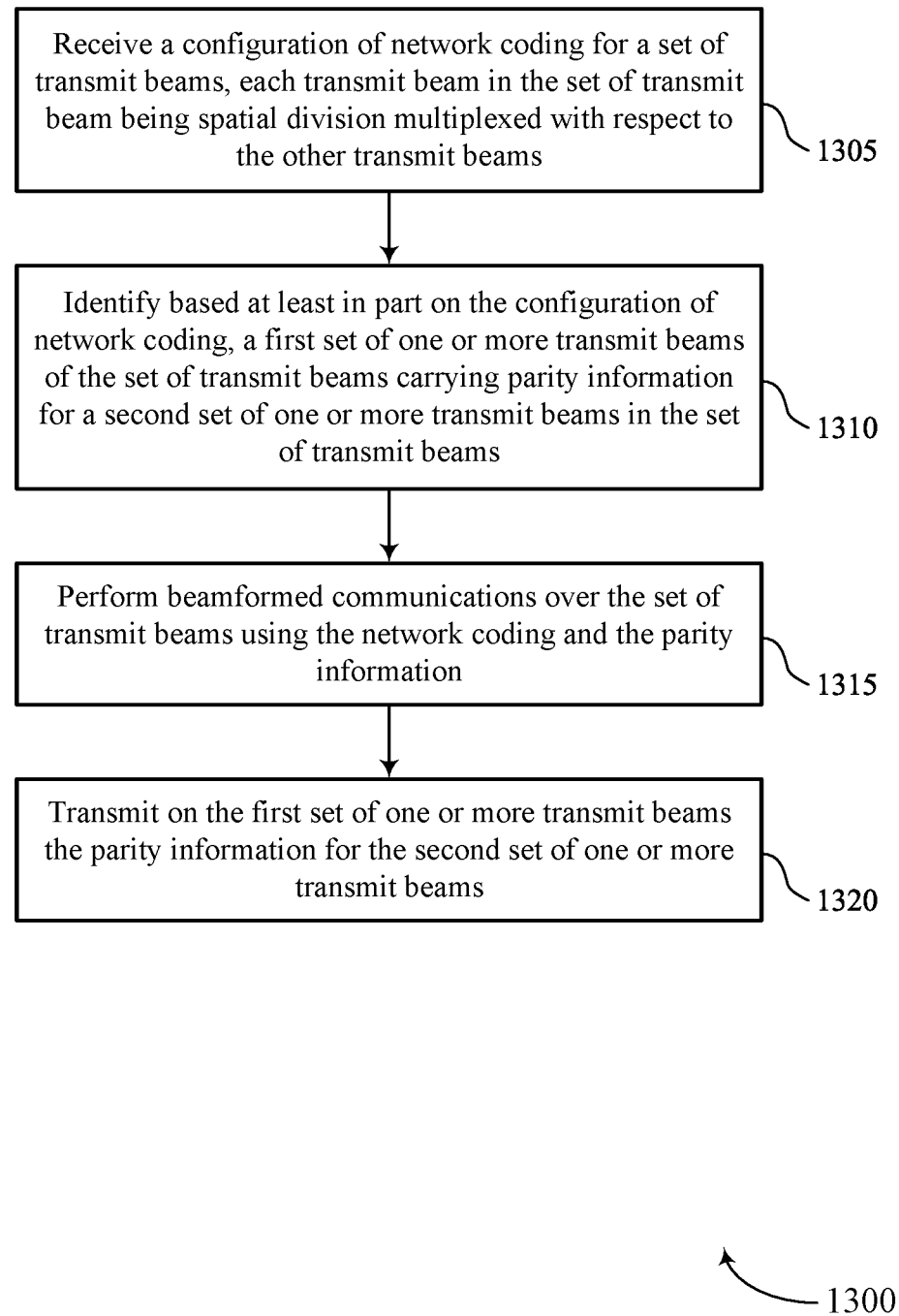

FIG. 13 shows a flowchart illustrating a method 1300 that supports network coding to mitigate blockage with SDM beams in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a configuration of network coding for a set of transmit beams, each transmit beam in the set of transmit beam being spatial division multiplexed with respect to the other transmit beams. The operations of 1305 may be performed in accordance with examples as disclosed herein. In some examples, aspects of the operations of 1305 may be performed by a network coding configuration manager 625 as described with reference to FIG. 6.

At 1310, the method may include identifying based on the configuration of network coding, a first set of one or more transmit beams of the set of transmit beams carrying parity information for a second set of one or more transmit beams in the set of transmit beams. The operations of 1310 may be performed in accordance with examples as disclosed herein. In some examples, aspects of the operations of 1310 may be performed by a transmit beam manager 630 as described with reference to FIG. 6.

At 1315, the method may include performing beamformed communications over the set of transmit beams using the network coding and the parity information. The operations of 1315 may be performed in accordance with examples as disclosed herein. In some examples, aspects of the operations of 1315 may be performed by a beamforming manager 635 as described with reference to FIG. 6.

At 1320, the method may include transmitting on the first set of one or more transmit beams the parity information for the second set of one or more transmit beams. The operations of 1320 may be performed in accordance with examples as disclosed herein. In some examples, aspects of the operations of 1320 may be performed by an uplink transmit beam manager 640 as described with reference to FIG. 6.

Figure 14:
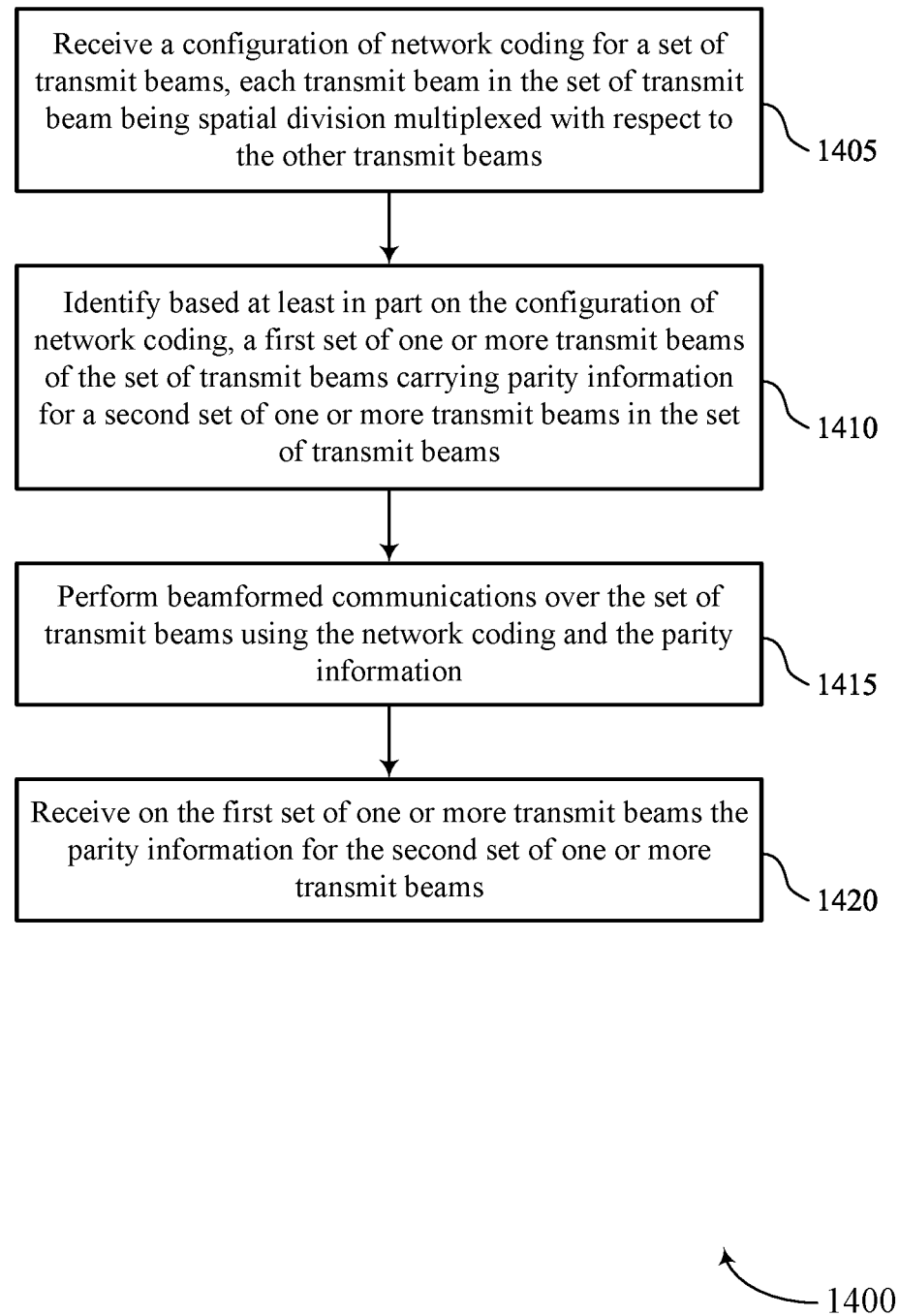

FIG. 14 shows a flowchart illustrating a method 1400 that supports network coding to mitigate blockage with SDM beams in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving a configuration of network coding for a set of transmit beams, each transmit beam in the set of transmit beam being spatial division multiplexed with respect to the other transmit beams. The operations of 1405 may be performed in accordance with examples as disclosed herein. In some examples, aspects of the operations of 1405 may be performed by a network coding configuration manager 625 as described with reference to FIG. 6.

At 1410, the method may include identifying based on the configuration of network coding, a first set of one or more transmit beams of the set of transmit beams carrying parity information for a second set of one or more transmit beams in the set of transmit beams. The operations of 1410 may be performed in accordance with examples as disclosed herein. In some examples, aspects of the operations of 1410 may be performed by a transmit beam manager 630 as described with reference to FIG. 6.

At 1415, the method may include performing beamformed communications over the set of transmit beams using the network coding and the parity information. The operations of 1415 may be performed in accordance with examples as disclosed herein. In some examples, aspects of the operations of 1415 may be performed by a beamforming manager 635 as described with reference to FIG. 6.

At 1420, the method may include receiving on the first set of one or more transmit beams the parity information for the second set of one or more transmit beams. The operations of 1420 may be performed in accordance with examples as disclosed herein. In some examples, aspects of the operations of 1420 may be performed by a downlink transmit beam manager 645 as described with reference to FIG. 6.

Figure 15:
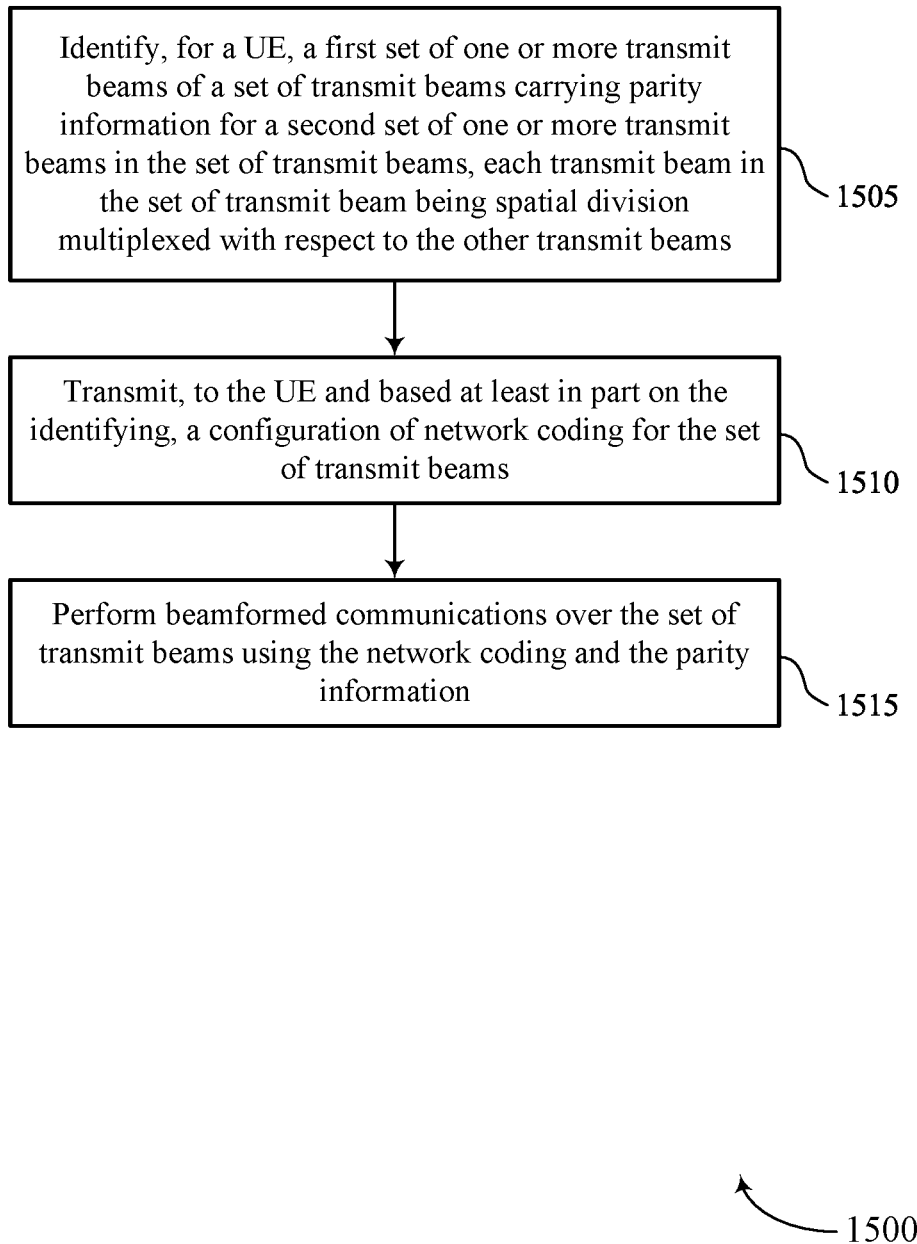

FIG. 15 shows a flowchart illustrating a method 1500 that supports network coding to mitigate blockage with SDM beams in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1505, the method may include identifying, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams. The operations of 1505 may be performed in accordance with examples as disclosed herein. In some examples, aspects of the operations of 1505 may be performed by a transmit beam manager 1025 as described with reference to FIG. 10.

At 1510, the method may include transmitting, to the UE and based on the identifying, a configuration of network coding for the set of transmit beams. The operations of 1510 may be performed in accordance with examples as disclosed herein. In some examples, aspects of the operations of 1510 may be performed by a network coding configuration manager 1030 as described with reference to FIG. 10.

At 1515, the method may include performing beamformed communications over the set of transmit beams using the network coding and the parity information. The operations of 1515 may be performed in accordance with examples as disclosed herein. In some examples, aspects of the operations of 1515 may be performed by a beamforming manager 1035 as described with reference to FIG. 10.

The following provides an overview of aspects of the present disclosure:

Aspect 1: A method for wireless communication at a UE, comprising: receiving a configuration of network coding for a set of transmit beams, each transmit beam in the set of transmit beam being spatial division multiplexed with respect to the other transmit beams; identifying based at least in part on the configuration of network coding, a first set of one or more transmit beams of the set of transmit beams carrying parity information for a second set of one or more transmit beams in the set of transmit beams; and performing beamformed communications over the set of transmit beams using the network coding and the parity information.

Aspect 2: The method of aspect 1, wherein performing beamformed communications over the set of transmit beams further comprises: transmitting on the first set of one or more transmit beams the parity information for the second set of one or more transmit beams.

Aspect 3: The method of aspect 2, further comprising: generating the parity information for the second set of one or more transmit beams in accordance with a network coding scheme indicated in the configuration of network coding.

Aspect 4: The method of aspect 3, wherein the network coding scheme comprises an XOR scheme such that the parity information transmitted on the first set of one or more transmit beams comprises an XOR of information transmitted on the second set of one or more transmit beams.

Aspect 5: The method of any of aspects 1 through 4, wherein performing beamformed communications over the set of transmit beams further comprises: receiving on the first set of one or more transmit beams the parity information for the second set of one or more transmit beams.

Aspect 6: The method of aspect 5, further comprising: decoding information from a first transmit beam of the second set of one or more transmit beams using the parity information received on the first set of one or more transmit beams and information decoded from at least a second transmit beam of the second set of one or more transmit beams, wherein decoding the information from the first transmit beam is in accordance with a network coding scheme indicated in the configuration of network coding.

Aspect 7: The method of aspect 6, wherein the network coding scheme comprises an XOR scheme such that the parity information transmitted on the first set of one or more transmit beams comprises an XOR of information transmitted on the second set of one or more transmit beams.

Aspect 8: The method of any of aspects 6 through 7, wherein decoding the information from the first transmit beam of the second set of one or more transmit beams further comprises: iteratively decoding a plurality of beams of the second set of one or more transmit beams, including performing a soft decision decoding procedure using the parity information transmitted on the first set of one or more transmit beams and the decoding result for at least the second transmit beam of the second set of one or more transmit beams.

Aspect 9: The method of any of aspects 6 through 8, wherein decoding the information from the first transmit beam of the second set of one or more transmit beams is further based at least in part on a retransmission of the information from the first transmit beam.

Aspect 10: The method of any of aspects 1 through 9, wherein the network coding is specific to one or more of a control channel or a data channel.

Aspect 11: The method of any of aspects 1 through 10, wherein the network coding is performed at one or more of a channel bit level or an information bit level.

Aspect 12: A method for wireless communication at a base station, comprising: identifying, for a UE, a first set of one or more transmit beams of a set of transmit beams carrying parity information for a second set of one or more transmit beams in the set of transmit beams, each transmit beam in the set of transmit beam being spatial division multiplexed with respect to the other transmit beams; transmitting, to the UE and based at least in part on the identifying, a configuration of network coding for the set of transmit beams; and performing beamformed communications over the set of transmit beams using the network coding and the parity information.

Aspect 13: The method of aspect 12, wherein performing beamformed communications over the set of transmit beams further comprises: transmitting on the first set of one or more transmit beams the parity information for the second set of one or more transmit beams.

Aspect 14: The method of aspect 13, further comprising: generating the parity information for the second set of one or more transmit beams in accordance with a network coding scheme indicated in the configuration of network coding.

Aspect 15: The method of aspect 14, wherein the network coding scheme comprises an XOR scheme such that the parity information transmitted on the first set of one or more transmit beams comprises an XOR of information transmitted on the second set of one or more transmit beams.

Aspect 16: The method of any of aspects 12 through 15, wherein performing beamformed communications over the set of transmit beams further comprises: receiving on the first set of one or more transmit beams the parity information for the second set of one or more transmit beams.

Aspect 17: The method of aspect 16, further comprising: decoding information from a first transmit beam of the second set of one or more transmit beams using the parity information received on the first set of one or more transmit beams and information decoded from at least a second transmit beam of the second set of one or more transmit beams, wherein decoding the information from the first transmit beam is in accordance with a network coding scheme indicated in the configuration of network coding.

Aspect 18: The method of aspect 17, wherein the network coding scheme comprises an XOR scheme such that the parity information transmitted on the first set of one or more transmit beams comprises an XOR of information transmitted on the second set of one or more transmit beams.

Aspect 19: The method of any of aspects 17 through 18, wherein decoding the information from the first transmit beam of the second set of one or more transmit beams further comprises: iteratively decoding a plurality of beams of the second set of one or more transmit beams, including performing a soft decision decoding procedure using the parity information transmitted on the first set of one or more transmit beams and the decoding result for at least the second transmit beam of the second set of one or more transmit beams.

Aspect 20: The method of any of aspects 17 through 19, wherein decoding the information from the first transmit beam of the second set of one or more transmit beams is further based at least in part on a retransmission of the information from the first transmit beam.

Aspect 21: The method of any of aspects 12 through 20, wherein the network coding is specific to one or more of a control channel or a data channel.

Aspect 22: The method of any of aspects 12 through 21, wherein the network coding is performed at one or more of a channel bit level or an information bit level.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a base station, comprising a processor; memory coupled with the processor; and instructions stored in the memory and executable by the processor to cause the apparatus to perform a method of any of aspects 12 through 22.

Aspect 27: An apparatus for wireless communication at a base station, comprising at least one means for performing a method of any of aspects 12 through 22.

Aspect 28: A non-transitory computer-readable medium storing code for wireless communication at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
  a processor;
  memory coupled with the processor; and
  instructions stored in the memory and executable by the processor to cause the apparatus to:
    receive an indication of network coding for a plurality of transmit beams, each transmit beam in the plurality of transmit beams being spatial division multiplexed with respect to other transmit beams in the plurality of transmit beams, wherein the plurality of transmit beams comprises a first set of one or more transmit beams and a second set of one or more transmit beams;
    identify, based at least in part on the indicated network coding, the first set of one or more transmit beams carrying parity information and first information, wherein the first information is unique to the first set of one or more transmit beams and the parity information is associated with recovery of second information carried on the second set of one or more transmit beams, wherein the parity information comprises an exclusive or (XOR) of the second information transmitted on the second set of one or more transmit beams; and
perform beamformed communications over the plurality of transmit beams using the network coding and the parity information.

2. The apparatus of claim 1, wherein the instructions to perform beamformed communications over the plurality of transmit beams are further executable by the processor to cause the apparatus to:
transmit the parity information on the first set of one or more transmit beams.

3. The apparatus of claim 2, wherein the instructions are further executable by the processor to cause the apparatus to:
generate the parity information in accordance with a network coding scheme indicated in the network coding.

4. The apparatus of claim 3, wherein the network coding scheme comprises an XOR scheme.

5. The apparatus of claim 1, wherein the instructions to perform beamformed communications over the plurality of transmit beams are further executable by the processor to cause the apparatus to:
receive the parity information on the first set of one or more transmit beams.

6. The apparatus of claim 5, wherein the instructions are further executable by the processor to cause the apparatus to:
decode information from a first transmit beam of the second set of one or more transmit beams using the parity information received on the first set of one or more transmit beams and information decoded from at least a second transmit beam of the second set of one or more transmit beams, wherein decoding the information from the first transmit beam is in accordance with a network coding scheme indicated in the network coding.

7. The apparatus of claim 6, wherein the network coding scheme comprises an XOR scheme.

8. The apparatus of claim 6, wherein the instructions to decode the information from the first transmit beam of the second set of one or more transmit beams are further executable by the processor to cause the apparatus to:
iteratively decode a plurality of beams of the second set of one or more transmit beams, including performing a soft decision decoding procedure using the parity information transmitted on the first set of one or more transmit beams and a decoding result for at least the second transmit beam of the second set of one or more transmit beams.

9. The apparatus of claim 6, wherein decoding the information from the first transmit beam of the second set of one or more transmit beams is further based at least in part on a retransmission of the information from the first transmit beam.

10. The apparatus of claim 1, wherein the network coding is specific to one or more of a control channel or a data channel.

11. The apparatus of claim 1, wherein the network coding is performed at one or more of a channel bit level or an information bit level.

12. An apparatus for wireless communication at a network device, comprising:
a processor;
memory coupled with the processor; and
instructions stored in the memory and executable by the processor to cause the apparatus to:
identify, for a user equipment (UE), a first set of one or more transmit beams of a plurality of transmit beams carrying parity information and first information, wherein the first information is unique to the first set of one or more transmit beams and the parity information is associated with recovery of second information carried on a second set of one or more transmit beams in the plurality of transmit beams, each transmit beam in the plurality of transmit beams being spatial division multiplexed with respect to other transmit beams in the plurality of transmit beams, and wherein the parity information comprises an exclusive or (XOR) of the second information transmitted on the second set of one or more transmit beams;
transmit, to the UE and based at least in part on the identifying, an indication of network coding for the plurality of transmit beams; and
perform beamformed communications over the plurality of transmit beams using the network coding and the parity information.

13. The apparatus of claim 12, wherein the instructions to perform beamformed communications over the plurality of transmit beams are further executable by the processor to cause the apparatus to:
transmit the parity information on the first set of one or more transmit beams.

14. The apparatus of claim 13, wherein the instructions are further executable by the processor to cause the apparatus to:
generate the parity information in accordance with a network coding scheme indicated in the network coding.

15. The apparatus of claim 14, wherein the network coding scheme comprises an XOR scheme.

16. The apparatus of claim 12, wherein the instructions to perform beamformed communications over the plurality of transmit beams are further executable by the processor to cause the apparatus to:
receive the parity information on the first set of one or more transmit beams.

17. The apparatus of claim 16, wherein the instructions are further executable by the processor to cause the apparatus to:
decode information from a first transmit beam of the second set of one or more transmit beams using the parity information received on the first set of one or more transmit beams and information decoded from at least a second transmit beam of the second set of one or more transmit beams, wherein decoding the information from the first transmit beam is in accordance with a network coding scheme indicated in the network coding.

18. The apparatus of claim 17, wherein the network coding scheme comprises an XOR scheme.

19. The apparatus of claim 17, wherein the instructions to decode the information from the first transmit beam of the second set of one or more transmit beams are further executable by the processor to cause the apparatus to:
iteratively decode a plurality of beams of the second set of one or more transmit beams, including performing a soft decision decoding procedure using the parity information transmitted on the first set of one or more transmit beams and a decoding result for at least the second transmit beam of the second set of one or more transmit beams.

20. The apparatus of claim 17, wherein decoding the information from the first transmit beam of the second set of one or more transmit beams is further based at least in part on a retransmission of the information from the first transmit beam.

21. The apparatus of claim 12, wherein the network coding is specific to one or more of a control channel or a data channel.

22. The apparatus of claim 12, wherein the network coding is performed at one or more of a channel bit level or an information bit level.

23. A method for wireless communication at a user equipment (UE), comprising:
 receiving an indication of network coding for a plurality of transmit beams, each transmit beam in the plurality of transmit beams being spatial division multiplexed with respect to other transmit beams in the plurality of transmit beams, wherein the plurality of transmit beams comprises a first set of one or more transmit beams and a second set of one or more transmit beams;
 identifying, based at least in part on the indicated network coding, the first set of one or more transmit beams carrying parity information and first information, wherein the first information is unique to the first set of one or more transmit beams and the parity information is associated with recovery of second information carried on the second set of one or more transmit beams, and wherein the parity information comprises an exclusive or (XOR) of the second information transmitted on the second set of one or more transmit beams; and
 performing beamformed communications over the plurality of transmit beams using the network coding and the parity information.

24. The method of claim 23, wherein performing beamformed communications over the plurality of transmit beams further comprises:
 transmitting the parity information on the first set of one or more transmit beams.

25. The method of claim 24, further comprising:
 generating the parity information in accordance with a network coding scheme indicated in the network coding.

26. The method of claim 25, wherein the network coding scheme comprises an XOR scheme.

27. A method for wireless communication at a network device, comprising:
 identifying, for a user equipment (UE), a first set of one or more transmit beams of a plurality of transmit beams carrying parity information and first information, wherein the first information is unique to the first set of one or more transmit beams and the parity information is associated with recovery of second information carried on a second set of one or more transmit beams in the plurality of transmit beams, each transmit beam in the plurality of transmit beams being spatial division multiplexed with respect to other transmit beams in the plurality of transmit beams, and wherein the parity information comprises an exclusive or (XOR) of the second information transmitted on the second set of one or more transmit beams;
 transmitting, to the UE and based at least in part on the identifying, an indication of network coding for the plurality of transmit beams; and
 performing beamformed communications over the plurality of transmit beams using the network coding and the parity information.

28. The method of claim 27, wherein performing beamformed communications over the plurality of transmit beams further comprises:
 transmitting the parity information on the first set of one or more transmit beams.

29. The method of claim 28, further comprising:
 generating the parity information for the second set of one or more transmit beams in accordance with a network coding scheme indicated in the network coding.

30. The method of claim 29, wherein the network coding scheme comprises an XOR scheme.

* * * * *